US009475199B2

(12) United States Patent
Burridge et al.

(10) Patent No.: US 9,475,199 B2
(45) Date of Patent: Oct. 25, 2016

(54) APPARATUS, SYSTEMS, AND METHODS FOR RECONFIGURABLE ROBOTIC MANIPULATOR AND COUPLING

(71) Applicant: TRACLabs, Inc., Webster, TX (US)

(72) Inventors: Robert Raven Burridge, Houston, TX (US); Mars Wei Chu, Houston, TX (US); Bryn Tyler Wolfe, League City, TX (US)

(73) Assignee: TRACLabs, Inc., Webster, TX (US)

( * ) Notice: Subject to any disclaimer, the term of this patent is extended or adjusted under 35 U.S.C. 154(b) by 645 days.

(21) Appl. No.: 13/911,073

(22) Filed: Jun. 5, 2013

(65) Prior Publication Data

US 2013/0340560 A1    Dec. 26, 2013

Related U.S. Application Data

(60) Provisional application No. 61/655,485, filed on Jun. 5, 2012.

(51) Int. Cl.
*B25J 17/00* (2006.01)
*B25J 17/02* (2006.01)
*B25J 18/00* (2006.01)
*B25J 9/06* (2006.01)
*B25J 9/08* (2006.01)
(Continued)

(52) U.S. Cl.
CPC ...... *B25J 17/00* (2013.01); *B25J 9/06* (2013.01); *B25J 9/08* (2013.01); *B25J 13/088* (2013.01); *B25J 17/025* (2013.01); *B25J 19/0004* (2013.01); *B25J 19/0033* (2013.01); *Y10T 74/20329* (2015.01)

(58) Field of Classification Search
CPC ........ B25J 9/08; B25J 19/0004; B25J 15/04; B25J 9/06; B25J 15/045; B25J 15/0408; B25J 19/0041; H01R 31/065
USPC .................................................. 439/76.1, 638
See application file for complete search history.

(56) References Cited

U.S. PATENT DOCUMENTS 4,766,775 A * 8/1988 Hodge ........................ B25J 9/08
                                                   403/13
4,875,275 A * 10/1989 Hutchinson ........... B23B 31/113
                                                   279/93

(Continued)

OTHER PUBLICATIONS

ATI Tool Changer Products: QC-11 Hollow Wrist, ATI Industrial Automation, Inc., Apex, North Carolina, www.ati-ia.com/products/toolchanger/QC.aspx?ID=QC-11 Hollow-Wrist, 2011 (accessed Jun. 27, 2011) (1 p.).

(Continued)

*Primary Examiner* — William Kelleher
*Assistant Examiner* — Jake Cook
(74) *Attorney, Agent, or Firm* — Gray Reed & McGraw, P.C.

(57) ABSTRACT

A robotic manipulator arm is disclosed. The arm includes joints that are attachable and detachable in a tool-free manner via a universal mating adapter. The universal mating adapter includes a built-in electrical interface for an operative electrical connection upon mechanical coupling of the adapter portions. The universal mating adapter includes mechanisms and the ability to store and communicate parameter configurations such that the joints can be rearranged for immediate operation of the arm without further reprogramming, recompiling, or other software intervention.

17 Claims, 19 Drawing Sheets

(51) Int. Cl.
  *B25J 13/08* (2006.01)
  *B25J 19/00* (2006.01)

(56) References Cited

U.S. PATENT DOCUMENTS

| | | | | |
|---|---|---|---|---|
| 5,460,536 A * | 10/1995 | Cullen | ............... | B23K 11/364 |
| | | | | 439/289 |
| 5,850,762 A * | 12/1998 | Kochanneck | ............. | B25J 9/08 |
| | | | | 180/65.1 |
| 6,084,373 A * | 7/2000 | Goldenberg | ............... | B25J 9/08 |
| | | | | 318/568.11 |
| 6,605,914 B2 * | 8/2003 | Yim | ........................ | B25J 9/08 |
| | | | | 318/568.11 |
| 2002/0053893 A1 * | 5/2002 | Khairallah | ............ | B25J 17/025 |
| | | | | 318/568.1 |
| 2003/0141155 A1 * | 7/2003 | Daneryd | ............. | B25J 19/0004 |
| | | | | 188/267.1 |
| 2010/0292836 A1 * | 11/2010 | Cheung | ................. | B25J 9/1617 |
| | | | | 700/245 |
| 2010/0307279 A1 * | 12/2010 | Campagna | ............... | B25J 15/04 |
| | | | | 74/490.05 |

OTHER PUBLICATIONS

ATI Tool Changer Products: QC-41, ATI Industrial Automation, Inc., Apex, North Carolina, www.ati-ia.com/products/toolchanger/QC.aspx?ID=QC-41, 2011 (accessed Jun. 27, 2011) (1 p.).

ATI Industrial Automation: Automatic/Robotic Tool Changers, ATI Industrial Automation, Inc., Apex, North Carolina, www.ati-ia.com/products/toolchanger/robot_tool_changer.aspx, 2011 (accessed Jun. 27, 2011) (1 p.).

* cited by examiner

APPARATUS, SYSTEMS, AND METHODS FOR RECONFIGURABLE ROBOTIC MANIPULATOR AND COUPLING

CROSS-REFERENCE TO RELATED APPLICATIONS

This application claims priority to U.S. provisional patent application Ser. No. 61/655,485 filed Jun. 5, 2012, and entitled "Apparatus, Systems, and Methods for Reconfigurable Robotic Manipulator and Coupling," which is hereby incorporated herein by reference in its entirety.

STATEMENT REGARDING FEDERALLY SPONSORED RESEARCH OR DEVELOPMENT

At least some portion of the technology disclosed herein was developed while work was performed for NASA on contract number NNJ08JA66C during the period that includes Jan. 29, 2007 to Aug. 29, 2010.

BACKGROUND

The disclosure relates generally to automation and robotics, and more particularly, the disclosure relates to manipulator arms, end-effectors, and adapter mechanisms for manipulator arms and end-effectors. Still more particularly, the present disclosure relates to apparatus and methods for interchanging and operating manipulator arms and end-effectors.

The field of automation and robotics augments and extends human activities and exploration both on earth and in space. Stationary robots are common in industrial settings for repetitive tasks such as product assembly and packaging. Mobile robots work in a variety of indoor and outdoor settings, moving through varied terrain and in varied environmental conditions. Mobile robots travel on the ground, through the air, and through water to investigate difficult-to-reach locations, handle chemicals, collect environmental samples and data, patrol property, search for people trapped in rubble, and perform a variety of other tasks.

The physical work of a robot is performed by end-effectors mounted on manipulator arms. Mating adapters connect the end-effector to the manipulator arm and the manipulator arm to the body of the robot. The end-effector may be a hand tool, a power tool, a dexterous gripper, a scientific probe, a scoop, or any other attachable device that allows the robot to engage its surroundings. A manipulator arm connects an end-effector to the body of the robot and provides reach capability. A manipulator arm includes one or more segments or joints each with the ability to move in prescribed directions. Basic movements for joints include pitch, which is like the rotational motion of a human elbow, roll, which is like the motion of a human wrist when the hand is rotated about the forearm axis, and linear extension/retraction. Forming a manipulator arm from multiple joints gives the manipulator more flexibility, i.e., the ability to move in more directions. The objective is to move the end-effector toward a target and to engage the target. Basic movements for an end-effector include translation (up-down, forward-backward, and left-right) and rotation (clockwise and counterclockwise). Each of the three translational movements may be assigned to one axis of a coordinate system defined by three orthogonal, mutually perpendicular axes. The axes may be called x, y, and z. The orientation and starting point (origin) of the group of axes may be defined with reference to one of several places. For example, the orientation and origin may be established at a fixed spot within the region being explored (earth or moon), on the robot body, or at the connection point of the end-effector. The last two locations would define a moving and rotating coordinate system because the robot moves and turns.

The total number of independent, basic movements that a particular manipulator arm or an end-effector may make is known as its degrees-of-freedom (DOF). Three DOF are achieved by the translational movement along the three axes. Forward and reverse movement along any one axis is considered one DOF. When the end-effector is rotated clockwise or counter-clockwise around any of the three axes, this capability adds three more DOF, for a total of six DOF. Adding more joints to a manipulator arm adds more DOF.

When a manipulator arm is formed from joints with pitch and roll capabilities, performing a straight translational movement of the end-effector requires the simultaneous movement of multiple joints. Moving multiple joints simultaneously is governed by software algorithms stored in a computer or in another control system that may be on the main body of the robot or separate from the robot.

The work required of a particular robot may change, often requiring modifications to the robot. Common modifications or reconfigurations involve replacing the end-effector or the entire manipulator arm. If the new equipment has a different connecting adapter, the adapter on the robot must be either modified or replaced. If the new equipment has the same adapter as the previous manipulator or end-effector, then the exchange will be simpler but may still require significant effort. The end-effector and manipulator arm may be coupled by an adapter using threaded fasters such as bolts and nuts or machine screws, or coupled by clamps, or coupled by a pneumatically-actuated lock mechanism. These coupling methods require one or more tools or a source of compressed air. Furthermore, the exchange of an end-effector and manipulator arm typically requires adjustment to the controlling software to account for the reach, DOF, lift capability, and other parameters of the new equipment. Seemingly simple modifications to a robot can often be time-consuming and labor intensive.

Accordingly, there remains a need in the art for improved devices and methods for reconfiguring robotic manipulators arms and end-effectors.

SUMMARY

A robotic manipulator arm is disclosed. The arm includes joints that are attachable and detachable in a tool-free manner via a universal mating adapter. The universal mating adapter includes a built-in electrical interface for an operative electrical connection upon mechanical coupling of the adapter portions. The universal mating adapter includes mechanisms and the ability to store and communicate parameter configurations such that the joints can be rearranged for immediate operation of the arm without further reprogramming, recompiling, or other software intervention.

In some embodiments, a reconfigurable robotic manipulator arm includes a first joint including a first end assembly having a mechanical coupling interface and an electrical interface, and a second end assembly having a mechanical coupling interface and an electrical interface, a second joint including a third end assembly having a mechanical coupling interface and an electrical interface, and a fourth end assembly having a mechanical coupling interface and an electrical interface, wherein the first and fourth end assemblies are connectable at the first and fourth mechanical coupling interfaces to form a first adapter between the first and second joints including an operative electrical connection between the first and fourth electrical interfaces, and wherein the first and second joints are detachable at the first adapter and re-connectable at the second and third mechanical coupling interfaces to form a second adapter between the first and second joints including an operative electrical connection between the second and third electrical interfaces. In some embodiments, at least one of the adapters includes a control board. In some embodiments, the control board is configured to store electrical data, such as operational parameters of at least one of the joints. In some embodiments, the control board is configured to pass power or electrical signals between coupled joints. In some embodiments, the control board is configured to pass power or electrical signals between a joint coupled to a robot or end-effector.

In some embodiments, a joint for a robotic manipulator arm includes a base section, a rotatable section, a motor configured to rotate the rotatable section or the base section with respect to the other section, a brake, and a magnetic brake release switch configured to be activated by a removable external magnet and when activated to release the joint to move freely, wherein a ferrous metal member may augment the performance of the magnetic brake release switch. In some embodiments, the joint includes a position sensor assembly configured to detect the absolute angular position of the rotatable section with respect to the base section wherein the position sensor assembly is mounted on one of the joint sections and passes or moves near a position-indicating design mounted on the other section of the joint.

In some embodiments, an adapter for connecting different portions of a robotic system includes a first assembly including a mechanical coupling interface and an electrical interface, and a second assembly including a mechanical coupling interface and an electrical interface, wherein the first assembly is connectable to a first portion of the robotic system, wherein the second assembly is connectable to a second portion of the robotic system, wherein the mechanical interfaces are connectable in a tool-free manner whereby the electrical interfaces are brought into contact to form an operative electrical connection in the adapter. In some embodiments, the first assembly and the second assembly comprise a plurality of mating pairs of slidably engageable electrical connectors to transfer data and power signals between the first and second assemblies and one or more attached joints. In some embodiments, the transfer of data or power will not occur unless at least one specified pair of mating electrical connectors is engaged, and wherein the other mating pairs of electrical connectors are always engaged whenever the at least one specified pair is partially engaged or engaged. In some embodiments, the first assembly forms a hermetically sealed barrier, or the second assembly forms a hermetically sealed barrier. In some embodiments, the adapter further includes a mechanism for automatically detaching an object from or attaching the object to a robotic joint or manipulator arm, the mechanism including a socket portion including the first assembly, a plug portion including the second assembly, at least one motor-driven surface, wherein the object to be detached or attached may be an end-effector or another joint, wherein the motor-driven surface is configured to induce the rotational engagement of the first and second assemblies, and wherein the mechanism is configured for automatic or manual operation.

Thus, embodiments described herein comprise a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed embodiments of the invention, reference will now be made to the accompanying drawings in which.

DETAILED DESCRIPTION

Figure 1:
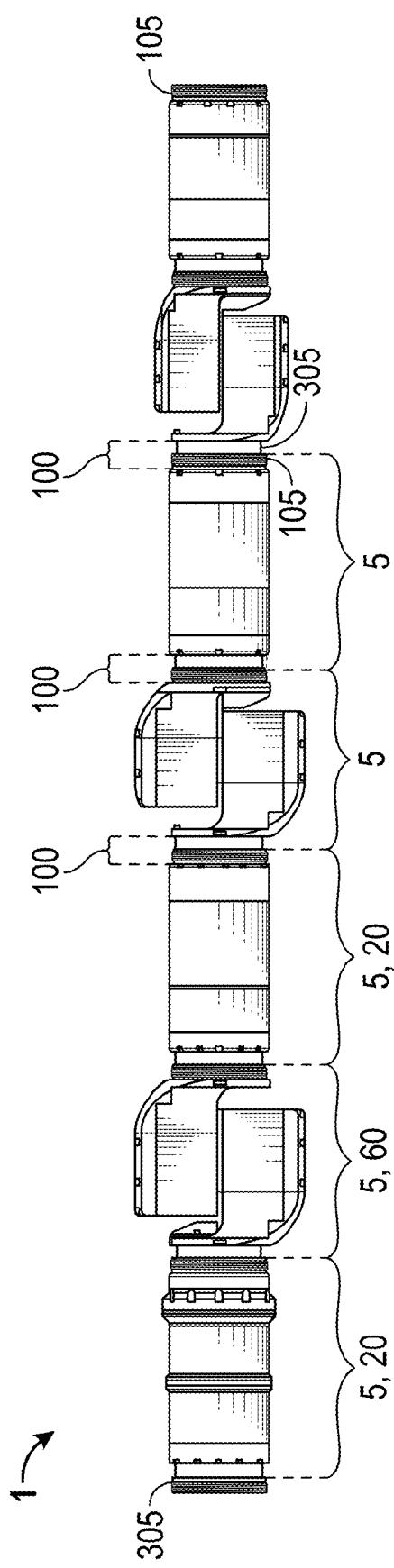
FIG. 1 is side view of an embodiment of a robotic manipulator arm comprising a series of connected joints in accordance with the principles disclosed herein.

The following discussion is directed to various embodiments of the invention. The embodiments disclosed should not be interpreted or otherwise used as limiting the scope of the disclosure. One skilled in the art will understand that the following description has broad application, and the discussion of any embodiment is meant only to be exemplary of that embodiment, and not intended to suggest that the scope of the disclosure, including the claims, is limited to that embodiment.

Certain terms are used in the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form, and some details of conventional elements may not be shown in interest of clarity and conciseness. In addition, like or identical reference numerals may be used to identify common or similar elements. However, for clarity in the figures, not every similar or common element will be identified.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples or is coupled to a second device, that connection may be through a direct connection, or through an indirect connection via other devices, components, and connections. In addition, as used herein, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to the axis, and a radial distance means a distance measured perpendicular to the axis.

The terms "system," "assembly," and "sub-assembly" may refer to a collection of two or more components, or elements, that are associated with one another and that may be coupled together. Furthermore, a system, assembly, or sub-assembly may be comprised of a collection of other, lesser systems, assemblies, or sub-assemblies. The terms "proximal" and "distal" will refer to the intended mounting location of an object or feature relative to the location of the main body of a robot or relative to the location of another supporting device. As such, proximal will describe an object or feature located closer to the main body of a robot as compared to a distal object or feature.

Figure 2:
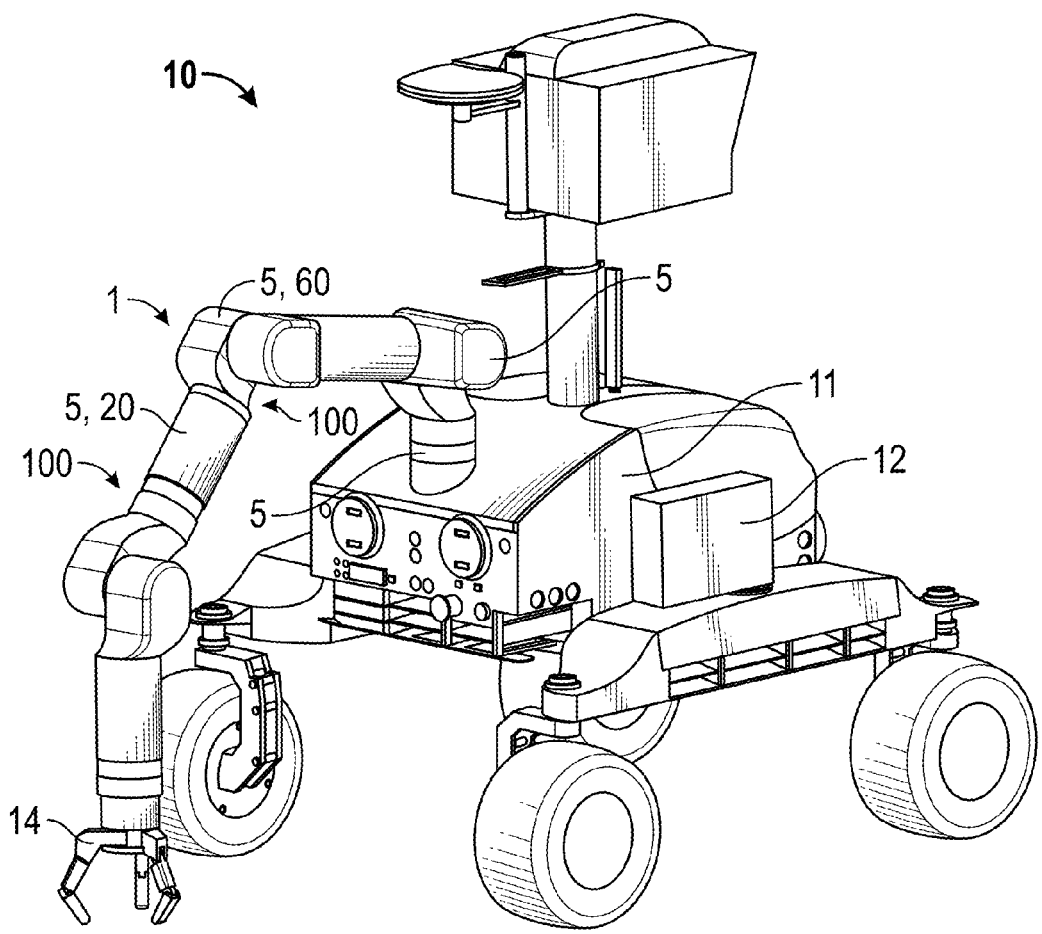
FIG. 2 is a perspective view of a mobile robot base coupled with the manipulator arm of FIG. 1 and an end-effector tool, in accordance with the principles disclosed herein.

FIG. 1 illustrates an embodiment of robotic manipulator arm 1 comprising one or more segments, or joints, 5. When arm 1 is formed from multiple joints 5, each joint 5 may be selectively coupled to an adjacent joint 5 by an interchangeable connector called a universal mating adapter (UMA) 100, which is alternatively called a universal mechanical-electrical coupling (UMEC). In FIG. 1, seven joints 5 are shown, but more or fewer joints 5 may be included in the configuration of a robotic manipulator arm like arm 1. Examples of various types of joints 5 include a roll joint 20 and a pitch joint 60, and will be explained in further detail in the disclosure below. The arm 1 may also include a UMA socket assembly 305. FIG. 2 illustrates an integrated system, called robot 10, comprising mobile robot base 11, an arm 1 with one or more UMA 100, and a robot controller 12. Robot controller 12 includes software to govern the performance of robot 10, including arm 1 and a tool 14. One of the UMA 100 (not visible) couples the robot main base 11 to one end of arm 1. Another UMA 100 may attach a tool, also called an end-effector, to the other end of arm 1. In the example of FIG. 2, gripping tool 14 is coupled to arm 1.

Figure 3:
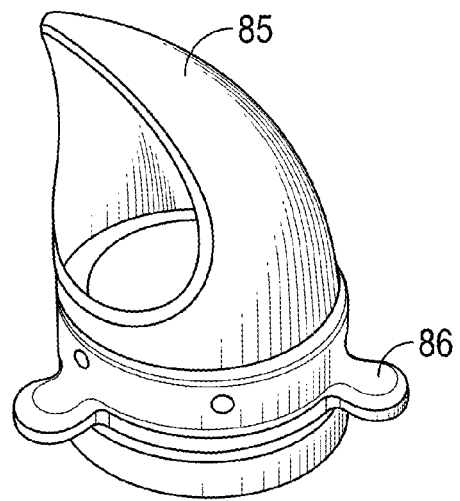
FIG. 3 is a perspective view of another end-effector tool that may couple to the manipulator arm of FIG. 1, in accordance with the principles disclosed herein.

Another example of an end-effector is tool 85 in FIG. 3, which, in this embodiment, is a scoop configured to collect a soil sample or to perform similar tasks. In other embodiments, tool 85 may instead incorporate a drill, a gripper, a saw, cameras, or another capability. Reference to tool 85 throughout the disclosure will assume that tool 85 has any one or more of these capabilities. In FIG. 3, tool 85 is shown with a tri-lobe adapter plate 86, which aids during removal and storage. Tool 85 may include sensors (not shown) to measure environmental conditions or tool performance or for diagnostics. If sensors are included in tool 85, power and data signals can be exchanged with the robot controller 12 through manipulator arm 1.

Figure 4:
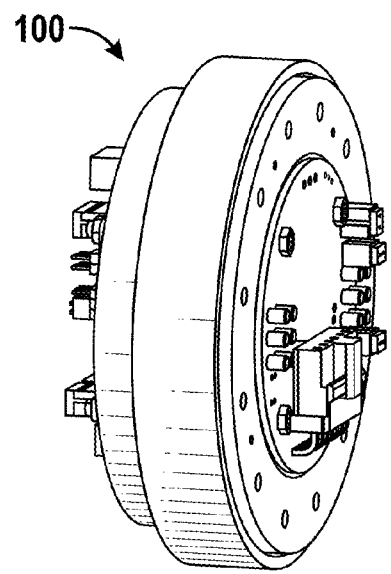
FIG. 4 is a perspective view of an embodiment of a universal mating adapter (UMA), which may also be referred to as a universal mechanical-electrical coupling (UMEC), in accordance with the principles disclosed herein.
Figure 5:
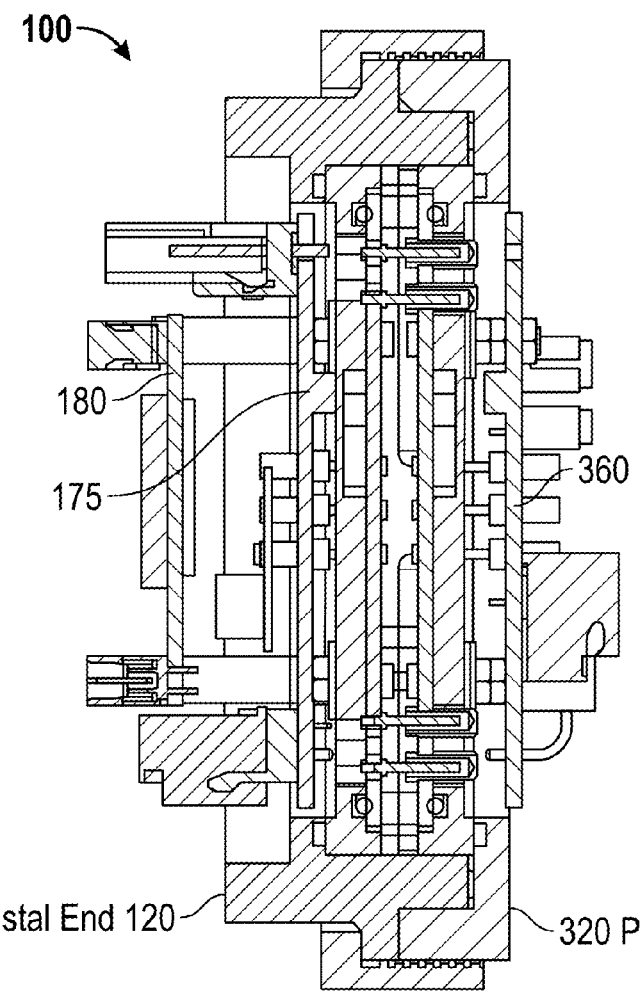
FIG. 5 is a sectional view of the UMA shown in FIG. 4, in accordance with the principles disclosed herein.

UMA 100 is shown in FIGS. 4 and 5. As identified in the exploded view of FIG. 6, UMA 100 comprises two primary sub-assemblies: a first or proximal sub-assembly called a UMA socket assembly 305 and a second or distal sub-assembly called a UMA plug assembly 105.

Figure 6:
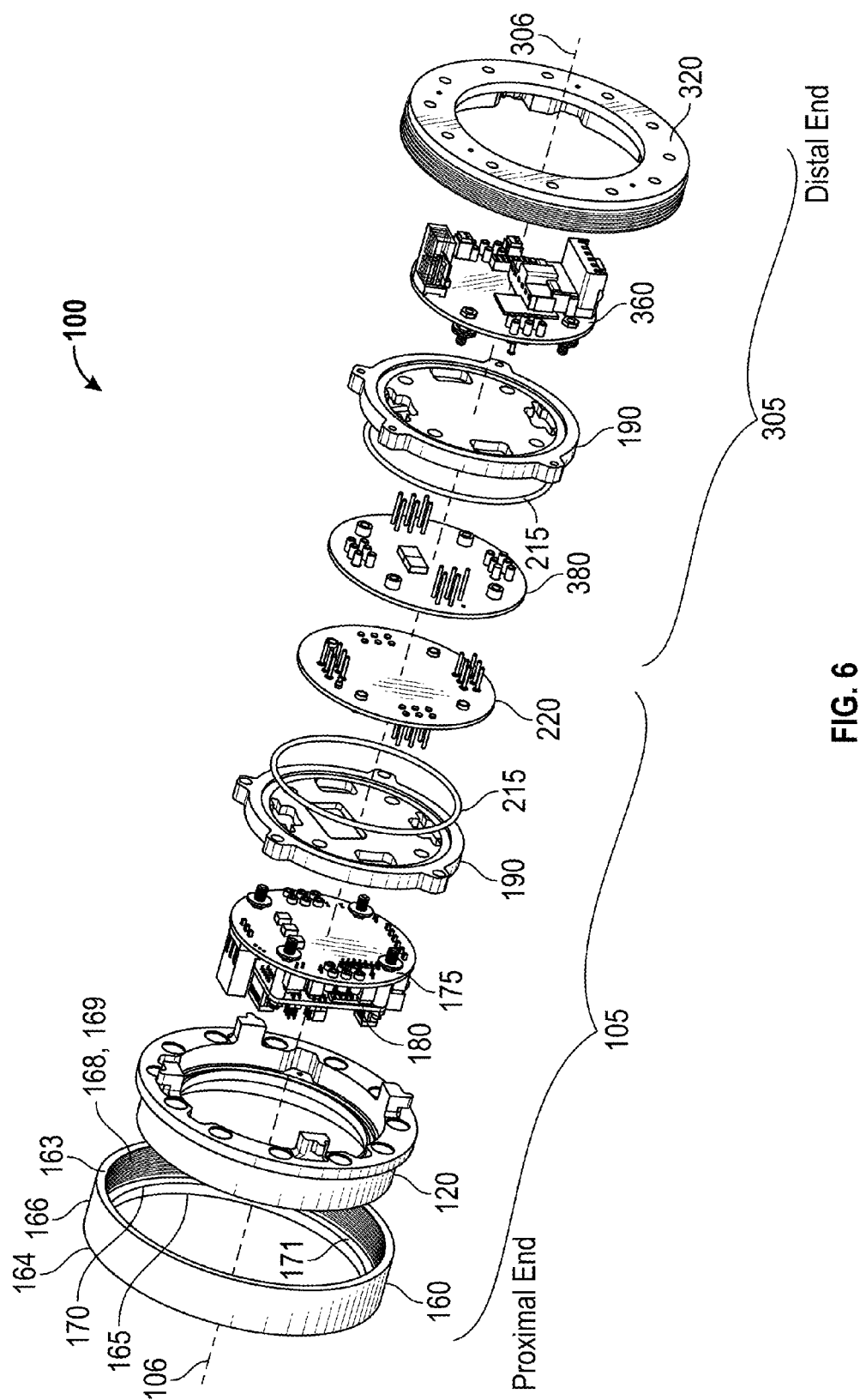
FIG. 6 is an exploded view of the UMA shown in FIG. 4 with the components of the plug assembly and the socket assembly identified, in accordance with the principles disclosed herein.

Referring to FIG. 6, UMA plug assembly 105 comprises several components: a generally annular plug connector body 120 (also FIG. 4), an internally threaded locking ring 160, a power board 175 (also FIG. 4), a control board 180 (also FIG. 4), a mounting plate 190, an o-ring 215, an electrical plug interface board 220, and a central axis 106. Each component of plug assembly 105 will be explained in the following paragraphs. Subsequently, the assembly of these components will be explained.

Figure 7:
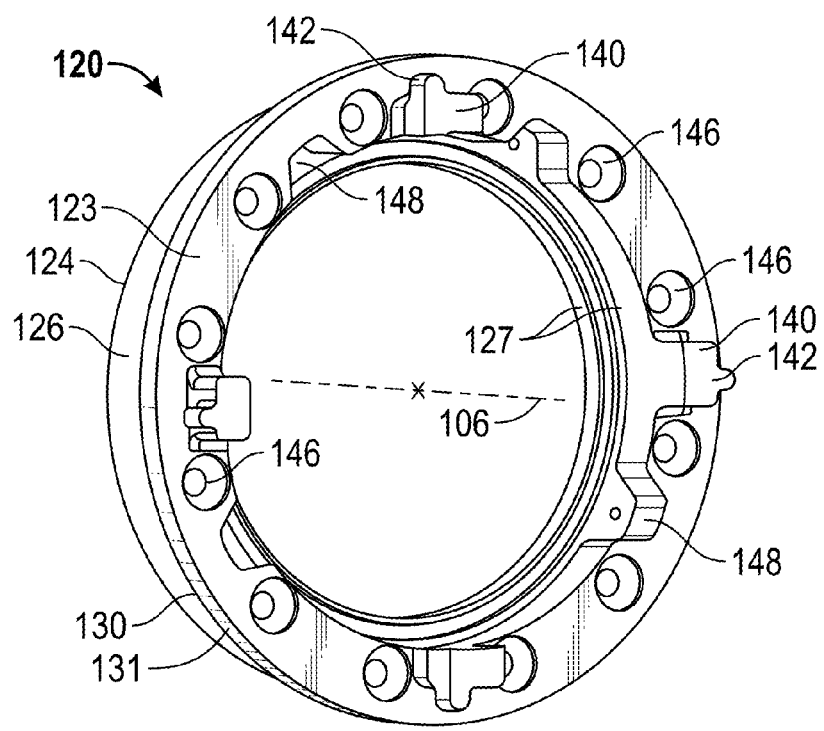
FIG. 7 is a perspective view of the plug connector body of the UMA shown in FIG. 6, in accordance with the principles disclosed herein.
Figure 8:
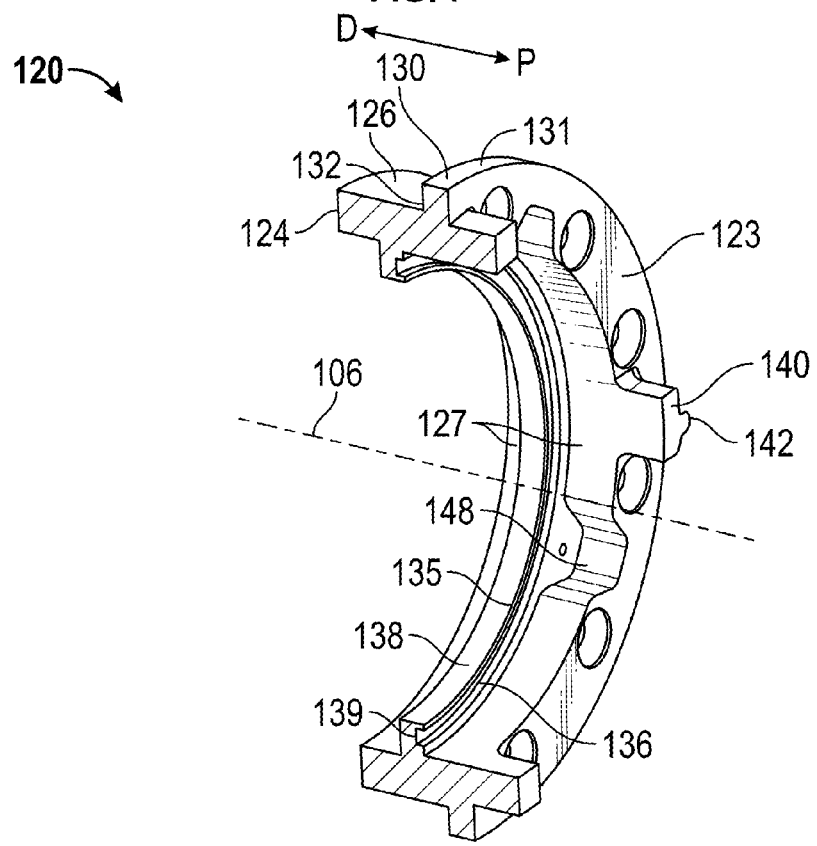
FIG. 8 is a perspective sectional view of the UMA plug connector body shown in FIG. 7, in accordance with the principles disclosed herein.

As shown in FIGS. 7 and 8, the generally annular plug connector body 120 of UMA plug assembly 105 comprises a central axis 106, a first or proximal end 123, second or distal end 124, cylindrical outer surface 126, cylindrical inner surface 127, a circumferential outer flange 130, an inner flange 135, generally rectangular mechanical bosses 140, countersunk through-holes 146, and generally trapezoidal recesses 148. Outer flange 130 is disposed at the proximal end 123 of plug body 120. Outer flange 130 comprises a distal end 132 and a cylindrical outer surface 131. Inner flange 135 is disposed axially near the center of the inner surface 127 and extends radially inward from inner surface 127. Inner flange 135 is characterized by a proximal surface 136, a cylindrical inner surface 138, and a seal gland 139 adjacent to proximal surface 136. Mechanical bosses 140 extend axially away from proximal end 123 and in some aspect define a continuation of inner surface 127. In the disclosed embodiment, plug body 120 has four mechanical bosses 140. Other embodiments may have a different number of bosses or may have bosses of different shapes but functionally similar to bosses 140. The end of each mechanical boss 140 includes an engagement tab 142, which extends radially outward and might not extend back to proximal surface 123. The engagement tabs 142 are uniquely placed on bosses 140 so that if plug body 120 is rotated about its central axis 106, the new position of engagement tabs 142 will only match their original position if the angle of rotation of plug body 120 is a multiple of 360 degrees. This angular limitation insures that mechanical bosses 140 and their corresponding engagement tabs 142 only allow UMA plug assembly 105 and UMA socket assembly 305 to engage in a single orientation relative to one another. The coupling of plug assembly 105 and socket assembly 305 will be described in more detail at a later point in this disclosure.

Continuing with plug connector body 120 in FIGS. 7 and 8, countersunk through-holes 146 start at proximal end 123 and extend through distal end 124 to allow machine screws (not shown) to couple plug body 120, and therefore all of UMA plug assembly 105, to a joint 5 of robotic manipulator arm 1. In depth, recesses 148 extend from proximal end 123 of plug body 120 to proximal surface 136 of inner flange 135. In the radial direction, recesses 148 in plug body 120 extend outward from inner surface 127.

Returning to FIG. 6, locking ring 160 includes a central axis 106, a first or proximal end 163, a second or distal end 164, a cylindrical outer surface 166, a cylindrical inner surface 168, and a flange 170. Additionally, threads 169 are cut into inner surface 168. Flange 170 at distal end 164 extends radially inward and includes a generally smooth, inner proximal face 171 within ring 160. Distal end 164 includes an external surface 165 that is perpendicular to central axis 106. In the example of FIG. 6, flange 170 includes a portion of external surface 165. The external surface 165 is generally smooth in at least one embodiment. In at least one embodiment, cylindrical outer surface 166 may have dimples, knurling, or another form of rough surface (not shown) to improve the ability of operators and equipment to grip surface 166.

Figure 9:
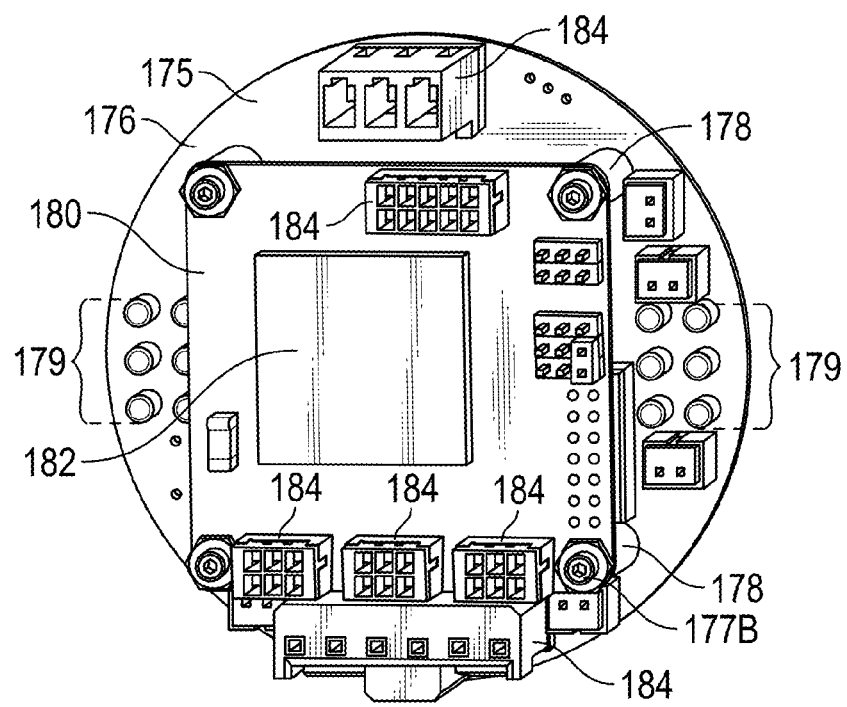
FIG. 9 is a first perspective view of the control board and power board of the UMA plug assembly shown in FIG. 6, in accordance with the principles disclosed herein.
Figure 10:
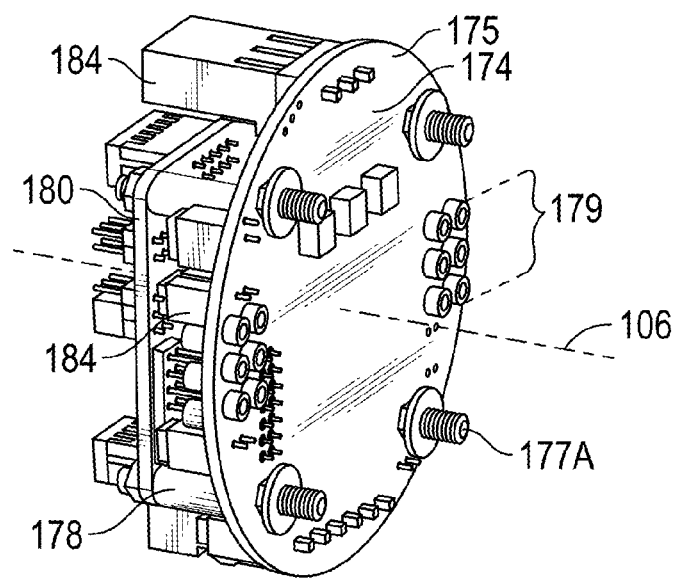
FIG. 10 is a second perspective view of the control board and power board of FIG. 9, in accordance with the principles disclosed herein.

FIGS. 9 and 10 present power board 175 and control board 180 of plug assembly 105, which are coupled by threaded fasteners 177a and nuts 177b, and are held at a fixed distance apart by spacers 178. Power board 175 comprises a central axis 106 a first or proximal face 174, a second or distal face 176, one or more sets of power and data connector receptacles 179, and a variety of multi-pin electrical connectors 184. Receptacles 179 pass through power board 175, extending beyond proximal face 174 and extending further beyond distal face 176. Although not shown, power board 175 may also comprise power conditioning circuitry, fuses, internal circuitry, and other components to aid in routing electrical power and data signals to a coupled joint 5 or to a coupled tool 85.

Control board 180 comprises one or more integrated circuits and a variety of multi-pin electrical connectors 184. Although not shown, control board 180 may also comprise fuses, internal circuitry, other integrated circuits, memory storage device(s), software, and other components to aid in managing a coupled joint 5 or a coupled tool 85. When coupled to power board 175, control board 180 is positioned nearest distal face 176, and threaded fasteners 177A extend beyond proximal face 174. Some of the multi-pin electrical connectors 184 couple control board 180 to power board 175. Other multi-pin electrical connectors 184 may couple with components, such as a motor or a sensor, of a joint 5 when a UMA plug assembly 105 is connected to a joint 5 or may couple to components of an end-effector tool (not shown).

Figure 11:
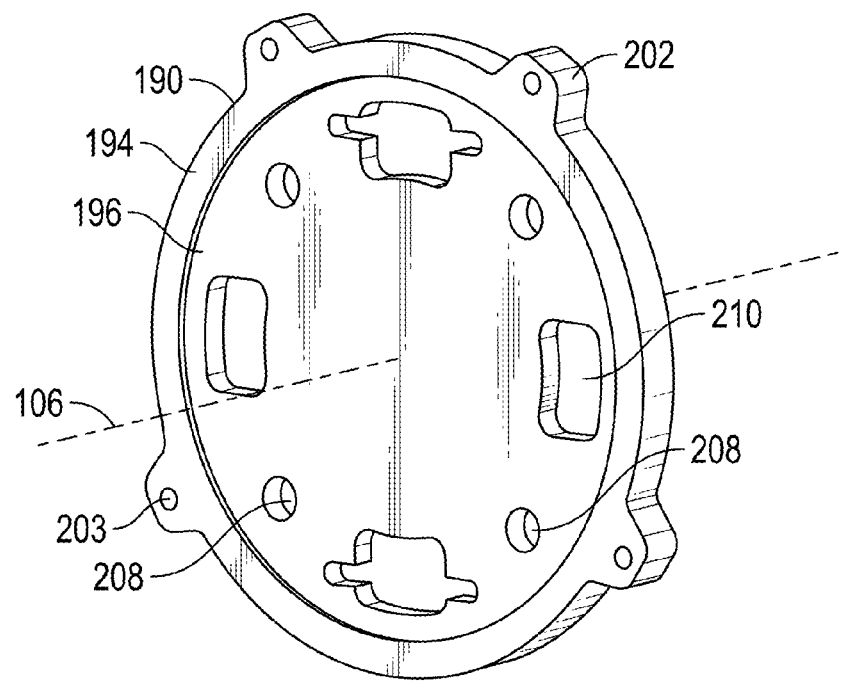
FIG. 11 is a first perspective view of a mounting plate of the UMA shown in FIG. 6, in accordance with the principles disclosed herein.
Figure 12:
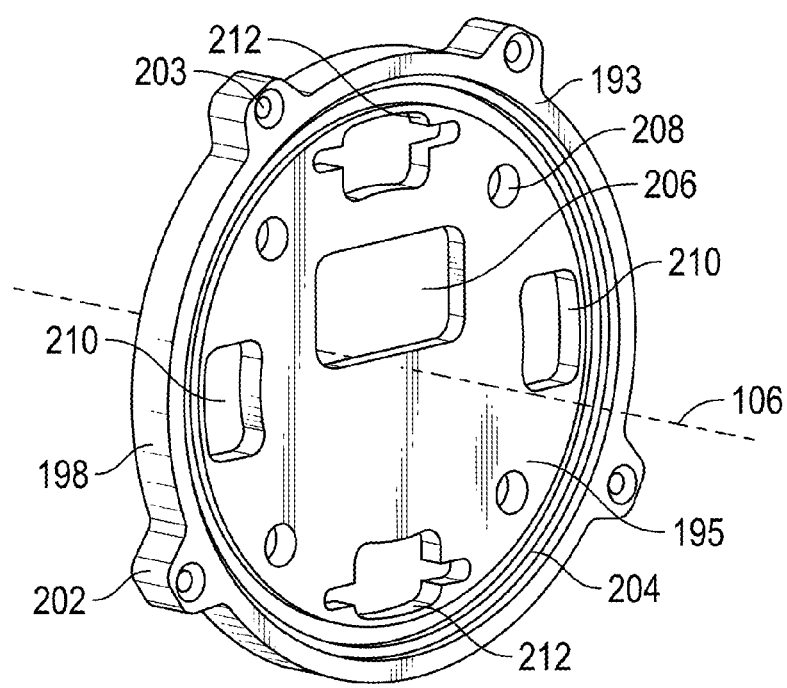
FIG. 12 is a second perspective view of the UMA mounting plate of FIG. 11, in accordance with the principles disclosed herein.

As indicated in FIG. 6, a mounting plate 190 or a derivative of plate 190 may be incorporated into either a UMA plug assembly 105 or a UMA socket assembly 305. As illustrated in FIGS. 11 and 12, mounting plate 190 includes a central axis 106, a first end 193, a second end 194, a first recessed face 195, a second recessed face 196, a generally cylindrical outer surface 198, multiple external circumferentially-spaced tabs 202, and a seal gland 204. First end 193, second end 194, first recessed face 195, and second recessed face 196 are perpendicular to central axis 106. Seal gland 204 is radially disposed near first end 193 between the first recessed face 195 and outer surface 198. More than one tab 202 is circumferentially-spaced along outer surface 198. The exemplary embodiment of mounting plate 190 includes four tabs 202. Each tab 202 includes a countersunk through-hole 203, starting at first end 193 and extending through second end 194. A generally rectangular recess 206 in face 195 is positioned off-center from central axis 106. At least one through-hole 208 extends from recessed face 195 to recessed face 196. In the example of plate 190, four through-holes 208 are positioned towards the outer radial extent of recessed face 195, approximately ninety degrees apart measured across axis 106. At least one generally rectangular slot 210 extends from recessed face 195 through recessed face 196 as does at least one slot 212. Slot 212 may be described as generally rectangular with the addition of wings, or smaller slots, that extend almost tangentially from either side of the primary slotted opening. In the example of plate 190, two slots 210 are disposed on opposite sides of central axis 106. Ninety degrees from these slots 210 are two of the slots 212.

Figure 13:
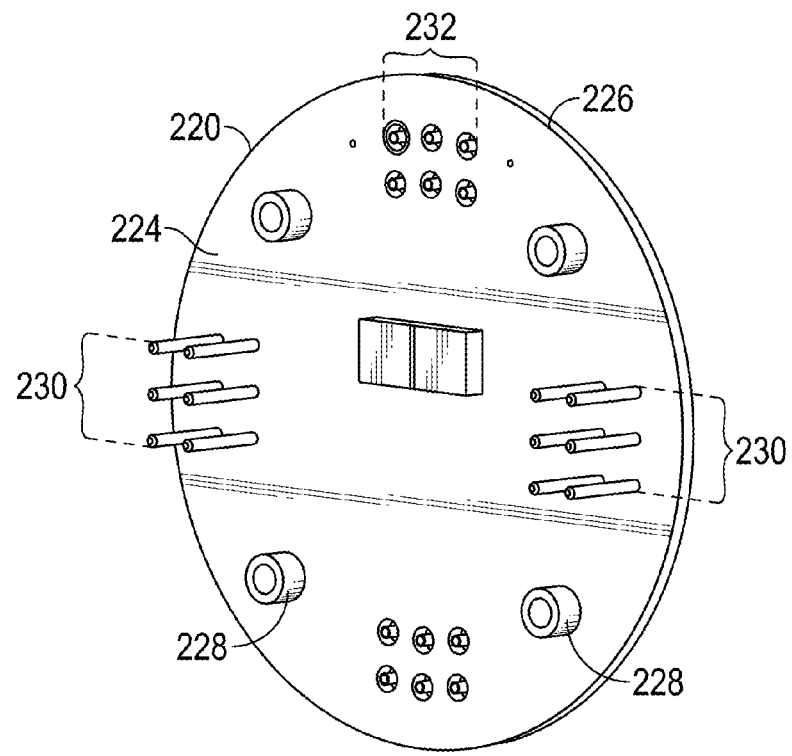
FIG. 13 is a first perspective view of a plug interface board for the UMA shown in FIG. 6, in accordance with the principles disclosed herein.
Figure 14:
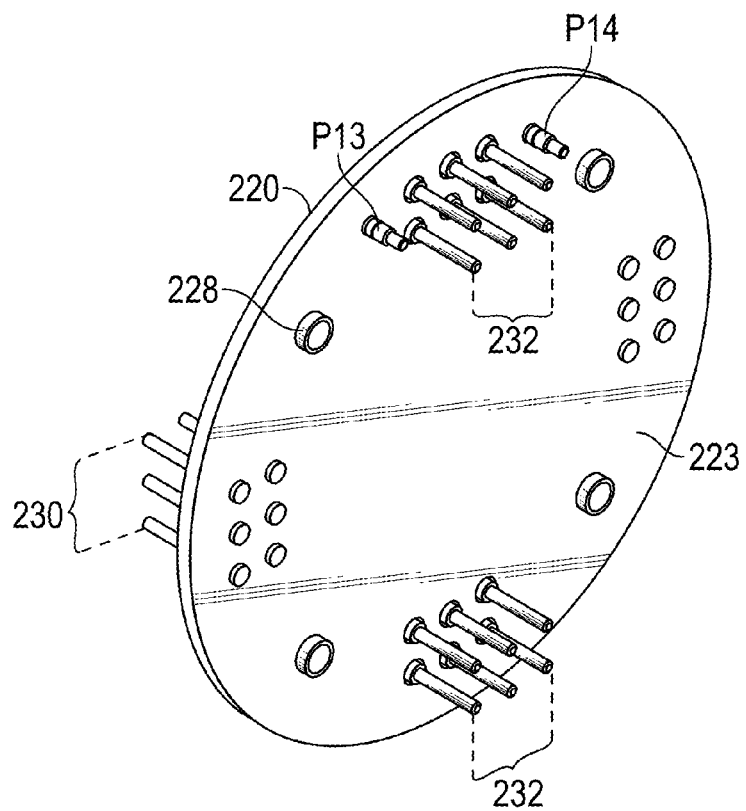
FIG. 14 is a second perspective view of the UMA plug interface board in FIG. 13, in accordance with the principles disclosed herein.

Referring to FIGS. 13 and 14, electrical plug interface board 220 of UMA plug assembly 105 comprises a central axis 106, a first or proximal face 223, a second or distal face 224, an cylindrical outer surface 226, one or more standoffs 228, one or more sets of internal power and data pins 230, and one or more sets of power and data transfer pins 232, and one or more spring-loaded axially-extendable pins P13, P14. In the exemplary embodiment shown, four standoffs 228 are fixedly attached to board 220 closer to outer surface 226 than to central axis 106 and spaced 90 degrees from each other about axis 106. Standoffs 228 pass through faces 223, 224, extending beyond proximal face 223 and extending further beyond distal face 224. Two sets of power and data pins 230, each with a plurality of pins, extend beyond face 224 on opposite sides of central axis 106. Two sets of power and data transfer pins 232, each with a plurality of pins, extend beyond face 223 on opposite sides of central axis 106 and displaced ninety degrees about axis 106 from the sets of pins 230. Axially-extendable pins P13, P14 are positioned on either side of one set of transfer pins 232, extending beyond face 223 but not as far beyond face 223 as any of the pins 232 extend. When pins P13 and P14 engage a mating surface on a member of a UMA socket assembly 305, power and data transfer between the mating plug assembly 105 and socket assembly 305 may be initiated. This coupling of plug assembly 105 and socket assembly 305 will be explained in more detail later in this disclosure.

As arranged in FIG. 6, A UMA plug assembly 105 may be compiled from the following parts, arranged generally in the order listed from the most distal to the most proximal component (left to right in FIG. 6): internally threaded locking ring 160, plug connector body 120, control board 180, power board 175, mounting plate 190, O-ring 215, and plug interface board 220. In an assembly, locking ring 160 is positioned around a plug connector body 120 such that proximal face 171 of inner flange 170 on ring 160 (FIG. 6) may abut the distal end 132 of outer flange 130 on plug body 120 (FIG. 8). In this manner, locking ring 160 and plug connector body 120 are loosely engaged with axial and rotational degrees-of-freedom (DOF), i.e., the capability to move relative to one another in the stated directions.

Another portion of plug assembly 105 will be considered next. As seen in FIG. 10, a control board 180 is coupled near the distal face 176 of a power board 175 by threaded fasteners 177A and nuts 177B, separated by an appropriate distance with spacers 178. The proximal ends of these threaded fasteners 177B are aligned and positioned in through-holes 208 of a mounting plate 190 (FIG. 12). The alignment includes the passing of the receptacles 179 on power board 175 through the slots 210 of mounting plate 190. An O-ring 215 (FIG. 6) seats within seal gland 204 near first end 193 which is positioned as the proximal side of the stated mounting plate 190. Once aligned and abutted, the distal face 224 of a plug interface board 220 (FIG. 14) seals against O-ring 215 to inhibit the passage of liquid or gas. In other words, as configured, a hermetically sealed barrier may be formed. Alignment of plug interface board 220 includes that insertion and coupling of fasteners 177B in standoffs 228. This description refers to the portion of fasteners 177B that pass through mounting plate 190. Internal data and power pins 230 slidingly engage receptacles 179 on power board 175, which are disposed within slots 210 of mounting plate 190.

As may be inferred from FIG. 6, tabs 202 of mounting plate 190 fit within recesses 148 of plug connector body 120 to be held by threaded fasteners (not shown) inserted through holes 203 and into body 120. This arrangement forms a UMA plug assembly 105. Power and data transfer pins 232 and axially-extendable pins P13 and P14 of interface board 220 extend from the proximal end of UMA plug assembly 105 as do mechanical bosses 140 of plug connector body 120. These extending features (232, P13, P14, 140) are available for engagement with a UMA socket assembly 305.

UMA socket assembly 305 of UMA 100 in FIG. 6 comprises multiple components: a generally annular socket connector body 320 (also FIG. 4), a power board 360 (also FIG. 4), a mounting plate 190, an o-ring 215, an electrical socket interface board 380, and a central axis 306. The components of socket assembly 305 will be explained in the following paragraphs. Subsequently, the assembly of these components will be explained.

Figure 15:
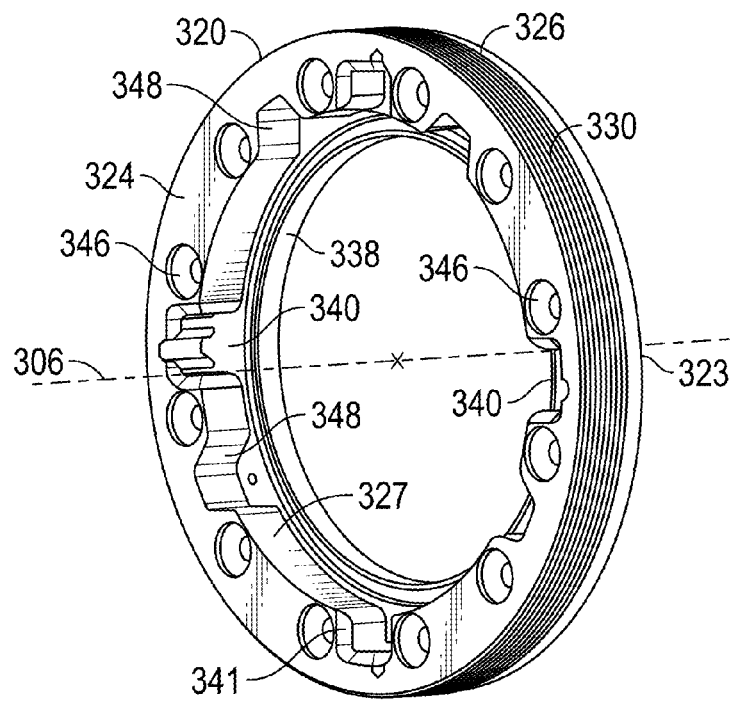
FIG. 15 is a perspective view of the socket connector body of the UMA shown in FIG. 6, in accordance with the principles disclosed herein.
Figure 16:
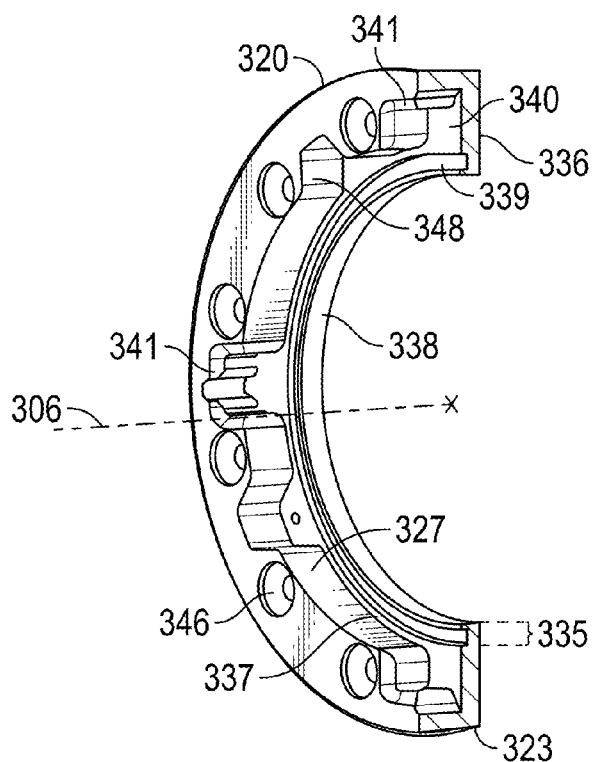
FIG. 16 is a second perspective sectional view of the socket connector body shown in FIG. 15, in accordance with the principles disclosed herein.

As shown in FIGS. 15 and 16, the generally annular socket connector body 320 comprises a central axis 306, a first or proximal end 323, a second or distal end 324, a generally cylindrical outer surface 326, a generally cylindrical inner surface 327, external threads 330, an inner flange 335, more than one multifaceted recess 340, countersunk through-holes 346, and generally trapezoidal recesses 348. Flange 335 extends radially inward from inner surface 327 with the exterior surface 336 flush at proximal end 323. Inner flange 335 is also characterized by a cylindrical inner surface 338 and a seal gland 339 adjacent to distal surface 337. In depth, multifaceted recesses 340 extend from distal end 324 of socket connector body 320 to distal surface 337 of inner flange 335. At distal end 324, multifaceted recesses 340 include chamfered portions 341. In the radial direction, multifaceted recesses 340 extend outward from inner surface 327 and may be considered to be an extension of inner surface 327. In the disclosed embodiment, socket connector body 320 has four multifaceted recesses 340; although, other embodiments may have a different number of recesses functionally similar to recesses 340. Each multifaceted recess 340 is shaped to slidingly engage and capture a particular mechanical boss 140 and a corresponding engagement tab 142 on plug connector body 120 (FIG. 7). This engagement limitation insures that a UMA plug assembly 105 and a UMA socket assembly 305 engage in a single orientation relative to one another.

Continuing with socket connector body 320 in FIGS. 15 and 16, countersunk through-holes 346 start at distal end 324 and extend through proximal end 323 to allow machine screws (not shown) to coupled socket connector body 320, and therefore all of UMA socket assembly 305, to a joint 5 of robotic manipulator arm 1. In depth, generally trapezoidal recesses 348 extend from distal end 324 of socket connector body 320 to distal surface 337 of inner flange 335. In the radial direction, recesses 348 in socket connector body 320 extend outward from inner surface 327.

Figure 17:
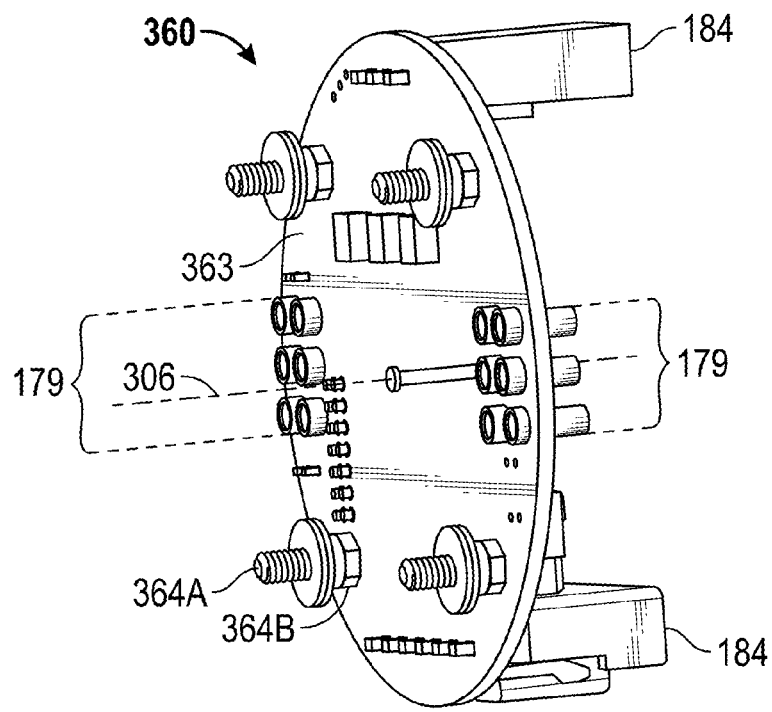
FIG. 17 is a first perspective view of a socket power board of the UMA shown in FIG. 6, in accordance with the principles disclosed herein.
Figure 18:
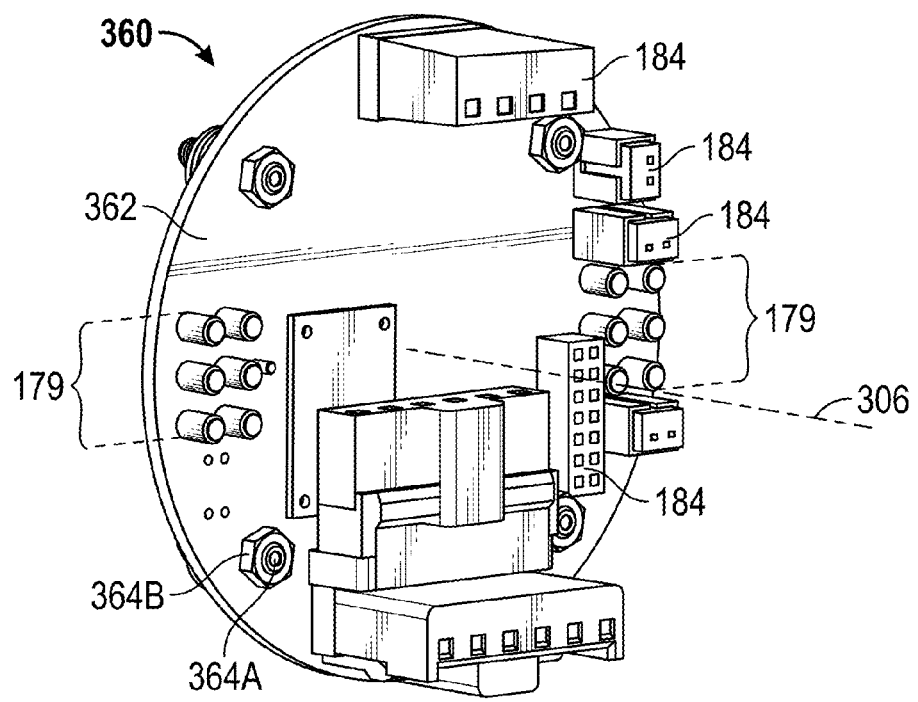
FIG. 18 is a second perspective view of the UMA socket power board of FIG. 17, in accordance with the principles disclosed herein.

FIGS. 17 and 18 present power board 360 of socket assembly 305 comprises a central axis 306, a first or proximal face 362, a second or distal face 363 one or more sets of power and data connector receptacles 179, a variety of multi-pin electrical connectors 184 and threaded fasteners 364A and nuts 364B. Although not shown, power board 360 may also comprise power conditioning circuitry, fuses, internal circuitry, electrical jumpers, and other components to aid in routing electrical power and data signals to a coupled joint 5 or to a coupled tool 85. Receptacles 179 pass through power board 175, extending beyond distal face 363 and extending further beyond proximal face 362. Threaded fasteners 364A extend beyond distal face 363. Multi-pin electrical connectors 184 may couple components, such as a motor or a sensor, within a joint 5 when a UMA socket assembly 305 is connected to a joint 5.

Figure 19:
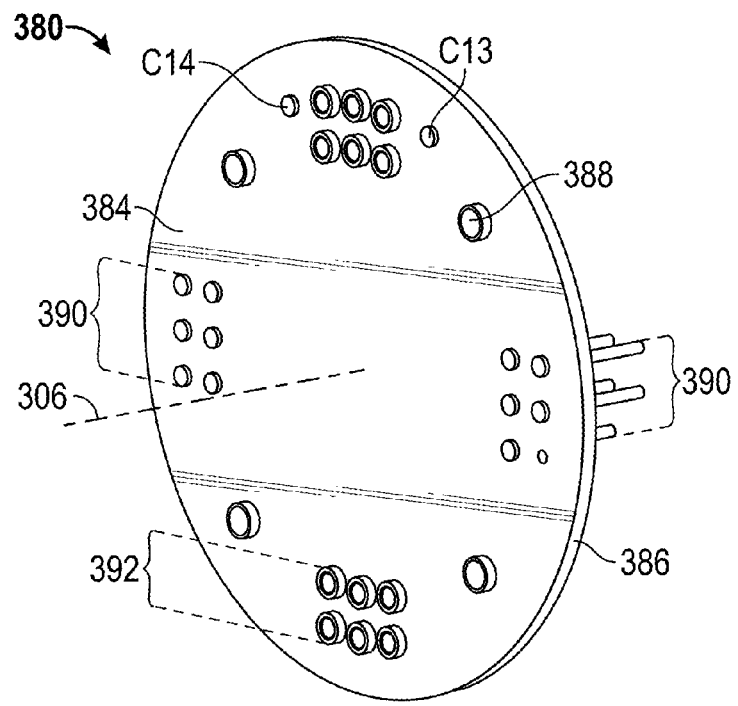
FIG. 19 is a first perspective view of a socket interface board for the UMA shown in FIG. 6, in accordance with the principles disclosed herein.
Figure 20:
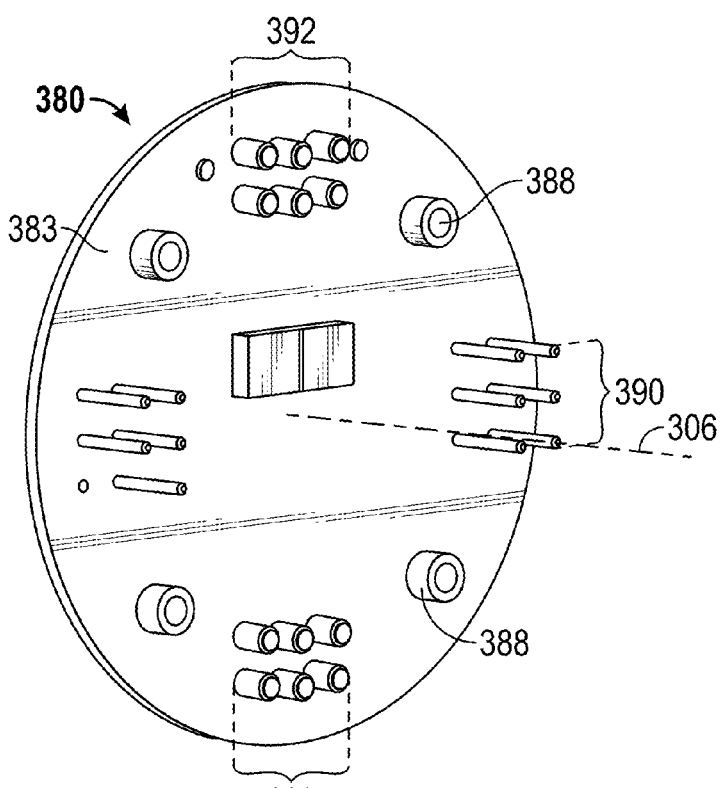
FIG. 20 is a second perspective view of the UMA socket interface board in FIG. 19, in accordance with the principles disclosed herein.

Referring to FIGS. 19 and 20, electrical socket interface board 380 of UMA socket assembly 305 comprises a central axis 306, a first or proximal face 383, a second or distal face 384, an cylindrical outer surface 386, one or more standoffs 388, one or more sets of internal power and data pins 390, one or more sets of power and data transfer receptacles 392, and one or more electrical contacts C13, C14. In the exemplary embodiment shown, four standoffs 388 are fixedly attached to board 380 closer to outer surface 386 than to central axis 106 and spaced 90 degrees from each other about axis 306. Standoffs 388 pass through faces 383, 384, extending beyond distal face 384 and extending further beyond proximal face 383. Two sets of internal power and data pins 390, each with a plurality of pins 390, extend beyond face 383 on opposite sides of central axis 306. Two sets of power and data transfer receptacles 392, each with a plurality of pins 392 pass through faces 383, 384, extending beyond distal face 384 and extending further beyond proximal face 383. The two sets of receptacles 392 are positioned on opposite sides of central axis 106 from each other and displaced ninety degrees about axis 106 from the sets of pins 390. Two electrical contacts C13, C14 are positioned on either side of one set of transfer pins 392. Electrical contacts C13, C14 are coupled to and nearly flush with face 384. When pins P13 and P14 of plug interface board 220 (FIG. 14) engage contacts C13, C14, power and data transfer between the mating plug assembly 105 and socket assembly 305 may be initiated. The coupling of plug assembly 105 and socket assembly 305 will be explained in more detail later in this disclosure.

Referring to the exploded view in FIG. 6, UMA socket assembly 305 may be compiled from the components previously described, arranged generally in the order listed next. The order proceeds from the most proximal to the most distal component, i.e., from right to left in FIG. 6. The components are: a socket connector body 320, a power board 360, a mounting plate 190, an o-ring 215, and a socket interface board 380. To form a socket assembly 305, the axes 306 for all components 320, 360, 190, and 380 are aligned. As will be explained, other features dictate the necessary angular (rotational) alignment of components 320, 360, 190, and 380. The socket connector body 320 forms a foundation for the socket assembly 305. The other referenced components coupled to the distal end 324 of body 320.

The threaded fasteners 364A extending from the distal face 363 of power board 360 (FIG. 17) are configured to pass through the holes 208 of mounting plate 190 (FIG. 11) and couple with standoffs 388 on socket interface board 380 (FIG. 20). Additional alignment interactions will now be described. When a sub-assembly is coupled as just described, second end 194 of mounting plate 190 (FIG. 11) faces distal face 363 of power board 360, making second end 194 the proximal end for the plate 190 in a socket assembly 305, which is the opposite of a plate 190 in a plug assembly 105 (FIG. 6). Correspondingly, first end 193 (FIG. 12) is positioned toward the most distal component, the socket interface board 380. An O-ring 215 (FIG. 6) seats within seal gland 204 on mounting plate 190, facing socket interface board 380. Once aligned and abutted, proximal face 383 of a socket interface board 380 (FIG. 20) seals against the o-ring 215 to inhibit the passage of liquid or gas. In other words, as configured, a hermetically sealed barrier may be formed. Additionally, receptacles 179 on power board 360 extend through the slots 210 of mounting plate 190 without contacting slot 210 and slidingly engage the internal power and data pins 390 extending from proximal face 383 on socket interface board 380. Power and data transfer receptacles 392 pass into slots 212 on mounting plate 190 without contacting slot 212 and without contacting power board 360.

With power board 360 and socket interface board 380 mutually coupled to mounting plate 190, tabs 202 of plate 190 (FIG. 12) fit within recesses 348 of socket connector body 320 (FIG. 15) to be held by threaded fasteners (not shown) inserted through holes 203 and into body 320. This arrangement forms a UMA socket assembly 305. Power and data transfer receptacles 392, electrical contacts C13, C14, and multifaceted recesses 340 of the distal face 384 of socket interface board 380 are available for engagement with a UMA plug assembly 105 as are external threads 330 of connector body 320.

Referring to FIGS. 5 and 6, the universal mating adapter (UMA) 100 comprises a UMA plug assembly 105 and UMA socket assembly 305. In some embodiments, assemblies 105 and 305 are coupled. In other embodiments, assemblies 105 and 103 are not coupled. To couple assemblies 105 and 305, axes 106 and 306 are aligned, and each mechanical boss 140 on plug connector body 120 (FIG. 7) is aligned with a prescribed multifaceted recess 340 on socket connector body 320 (FIG. 15). Assemblies 105 and 305 are moved axially toward one another. In the early stages of contact between 105 and 305, minor misalignment between bosses 140 and recesses 340 may be corrected by the chamfered portions 341 at the edge of recesses 340, which are configured to guide the entry of bosses 140. When mechanical bosses 140 are aligned with and are partially within recesses 340, power and data transfer receptacles 392 on socket interface board 380 (FIG. 19) slidingly receive power and data transfer pins 232 on interface board 220 (FIG. 14) of plug assembly 105. Therefore, bosses 140 and recesses 340 have a self-aligning, self-correcting capability to protect pins 232 from being bent during the coupling of a UMA. When plug assembly 105 and socket assembly 305 are axially closer and have greater contact between receptacles 392 and pins 232, then axially-extendable pins P13, P14 (FIG. 14) touch electrical contacts C13, C14 (FIG. 19), respectively, to form a combined and operative electrical interface between the electrical interfaces 220, 380.

If plug assembly 105 or socket assembly 305 is energized during the coupling process, the receptacles 392 and the mating pins 232 are inactive until pins P13, P14 connect with electrical contacts C13, C14. The contact of pins P13, P14 with electrical contacts C13, C14 may initiate power and data transfer between receptacles 392 and mating pins 232. Similarly for de-coupling or disconnecting, a plug assembly 105 and socket assembly 305 of a coupled UMA 100 are configured to be de-energized when disconnection is initiated. So, during disconnection and while disconnected, the plug assembly 105 and socket assembly 305 pair are de-energized. In this scenario, power and data transfer between receptacles 392 and the mating pins 232 will cease when pins P13, P14 cease to mate with electrical contacts C13, C14, which will occur before the receptacles 392 and the mating pins 232 disconnect. As a consequence of these characteristics, UMA 100 is "hot swappable," meaning a plug assembly 105 and a socket assembly 305 may be connected or disconnected while one or both assemblies 105, 305 is energized.

When assembled as shown in FIGS. 4 and 5, the universal mating adapter (UMA) 100 is configured to transfer force and torque loads between an external object connected to plug connector body 120, and an another external object connected to socket connector body 320. One or more of the external objects may be a joint 5. UMA 100 is also configured to transfer power and data signals between the power board 360 and the pair that includes control board 180 and power board 175. Power board 360 may also couple and exchange power and data signals with an external object, such as one of the previously referenced joints 5. Control board 180 and power board 175 may individually or collectively couple and exchange power and data signals with an external object, such as a joint 5.

As introduced earlier in relation to FIG. 1, robotic manipulator arm 1 comprises a series of joints 5, each configured to be selectively coupled to an adjacent joint 5 with a UMA 100. That is to say the plug assembly 105 on a first joint 5 is configured to couple to the socket assembly 305 of a second, adjacent joint 5. The locking ring 160 of the plug assembly 105 is configured to engage threadingly with the socket connector body 320 of the socket assembly 305 and thereby to hold firmly together (i.e., to lock) the assemblies 105, 305 and the accompanying joints 5.

The embodiment of FIG. 1 includes two types of joints 5 in manipulator arm 1, named according to the type of motion each one is configured to perform. The first type of joint, the roll joint 20, is illustrated in greater detail in FIG. 21. The second type of joint, the pitch joint 60, is illustrated in greater detail in FIGS. 26 and 27. Various other embodiments include one type of joint 5 or more than two types of joints 5. Thus, other embodiments of manipulator arm 1 may include other types of joints 5, such as a joint configured for linear extension or retraction. Some embodiments may include a joint that is configured as a combination of or a variation of roll joint 20 and pitch joint 60.

The various joints 5 may vary in size depending on the task or location of the joint. A joint 5 that is coupled directly to a robot or is mounted in a more proximal location to the robot may be larger and stronger than other joints 5 that are more distal. A more proximal joint 5 must be configured to support the weight, force, and torque loads of any joints 5 that may be mounted beyond the proximal joint 5. A distal joint 5 has less load to support than a more proximal joint 5, and so the distal joint 5 may be sized smaller, if appropriate for the intended task. This disclosed size variation may be implemented for joints 20, 60 or any other type of joint 5 that is used. Depending on the location, size, or intended purpose of particular a joint 5, 20, 60, the joint may be described as a shoulder, elbow, wrist, or base joint 5, 20, 60. Such a designation is intended for convenience when discussing a joint and is not intended to describe a limitation of the joint.

UMA 100 is configured as a common connector to couple the various pairs of adjacent joints 5, 20, 60 in manipulator arm 1, whether the multiple joints 5, 20, 60 are similar in size or differ in size. A plug assembly 105 connects to the proximal end, and a socket assembly 305 connects to the distal end of each joint 5, 20, 60.

With the inclusion of a UMA 100, two joints may be coupled or uncoupled manually without tools, i.e., in a tool-free manner, and without an external power source. Because all joints use the same connector, i.e., UMA 100, the order of the joints 5, 20, 60 in a manipulator arm 1 may be rearranged, and the number of joints 5, 20, 60 can be changed as compared to FIG. 1, making manipulator arm 1 reconfigurable and scalable. Within the plug assembly 105 of the UMA 100 coupled to each joint 5, 20, 60, the control board 180 is configured to exchange configuration parameters and other data with the control boards 180 coupled to adjoining joint(s) 5, 20, 60. The exchanged parameters from each joint may include the type of joint, range of motion, gear transmission ratio, length of joint, mass of joint, the zero angular location ("home") of the joint, sensor information, and possibly other pertinent information. The parameters and other data may also be exchanged with a controller, such as robot controller 12 in FIG. 2. Power boards 175 and 360 in each UMA 100 pass power and aid with the parameter and data exchange to and from joints 5, 20, 60. Power, parameters, and data may also be transmitted for an end-effector, such as gripping tool 14 or and embodiment of tool 85. The exchange of these parameters and data facilitates the capability to remove joints from, to add joints to, and to rearrange the sequence of joints within arm 1 without reprogramming or recompiling the software running in control boards 180 or the software running in controller 12. Controller 12 is configured to automatically recognize and control one or more joints 5, 20, 60 even after the quantity or sequence of joints has been altered.

Next, the specifications for a roll joint 20 and for a pitch joint 60 will be explained. In the descriptions, reference will be given to a base section and to a rotatable or movable section of the joint 20, 60. The base section is intended to be coupled more proximal the robot 10 or another mounting device than is the rotatable section of the same joint 20, 60. Thus, the base section refers to the portion of a joint 20 or 60 that is intended couple to the robot directly or to couple to the robot indirectly through one or more joints more proximal. The rotatable section is attached to the base section and is the portion of the joint that is configured to be moved relative to the base section. For example, for a joint 20, 60 that is directly coupled to the robot, the base section of that joint is configured to remain stationary relative to the robot when the joint operates to move the other, rotatable section. For joints 20, 60 that couple indirectly to the robot by means of intervening joints, the base section remains stationary relative to the robot if all intervening joints remain stationary. However, in some situations, it is possible for a base section to move while the corresponding rotatable section remains stationary. In general, the base section and the rotatable section of a joint are configured to move relative to each other. More generally, one or both sections of a joint 20, 60 on an arm 1 are configured to move relative to a fixed coordinate system (not shown) due to the movement of one or more joints 5 in the manipulator arm 1, due to the movement of robot 10 when coupled to arm 1, or due to outside forces.

Figure 21:
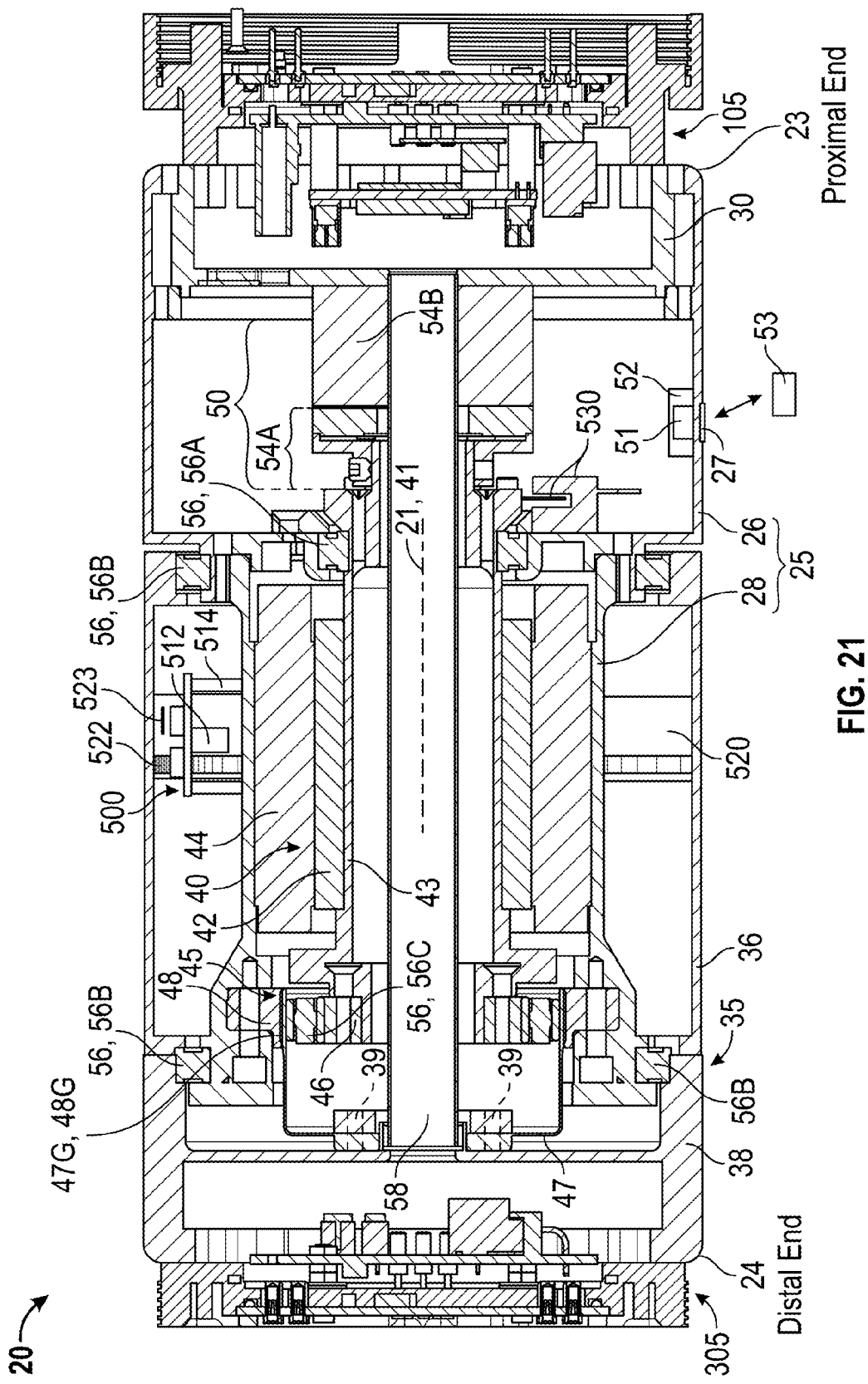
FIG. 21 illustrates a sectional view of a roll joint that may be incorporated into the robotic manipulator arm of FIG. 1, in accordance with the principles disclosed herein.
Figure 22:
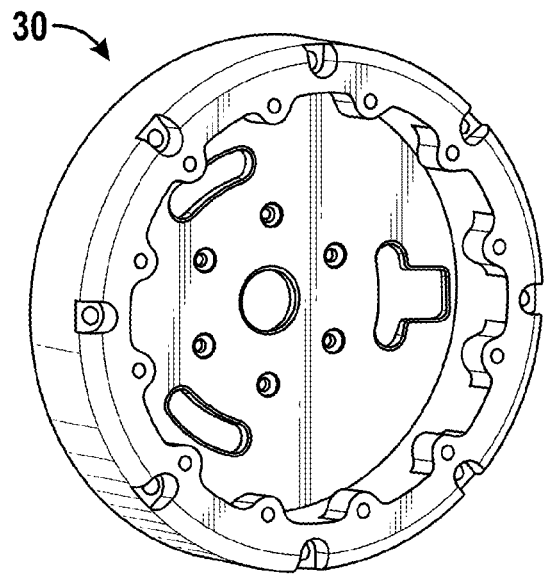
FIG. 22 is a perspective view of a proximal end cap for the roll joint of FIG. 21 to attach the UMA plug connector body of FIG. 7, in accordance with the principles disclosed herein.
Figure 23:
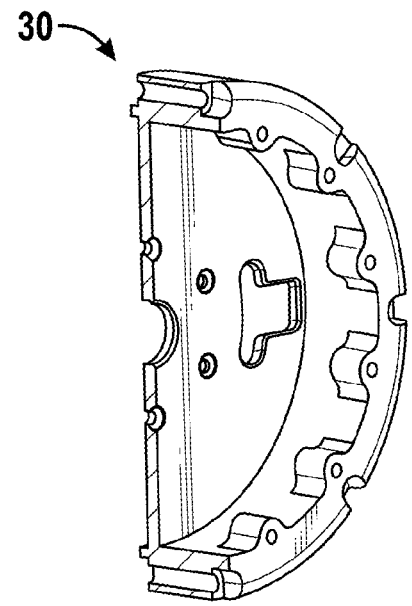
FIG. 23 is perspective sectional view of the proximal end cap of FIG. 22, in accordance with the principles disclosed herein.
Figure 24:
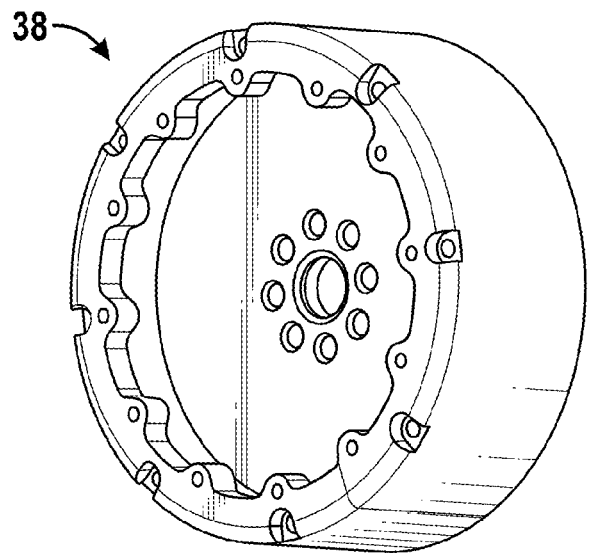
FIG. 24 is a perspective view of a distal end cap for the roll joint of FIG. 21 to attach the UMA socket connector body of FIG. 15, in accordance with the principles disclosed herein.
Figure 25:
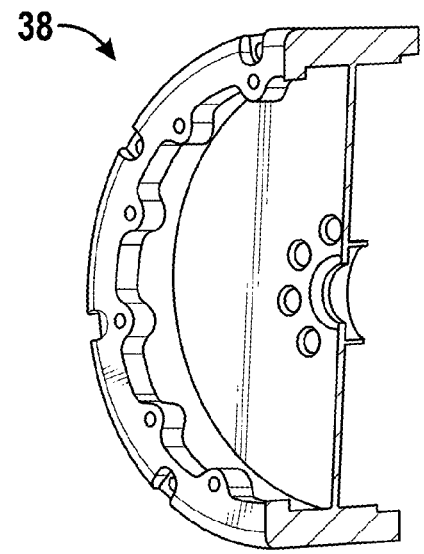
FIG. 25 is perspective sectional view of the distal end cap of FIG. 24, in accordance with the principles disclosed herein.

A cross-sectional view of a roll joint 20 is illustrated in FIG. 21. Roll joint 20 comprises a central axis 21, a first or proximal end 23, a second or distal end 24, a base section 25, a rotatable section 35, a motor 40, a gear mechanism, such as harmonic drive 45, a brake assembly 50, one or more rotational bearings 56, and a central wiring tube 58. Base section 25 includes an external shell 26, an internal shell 28, and a proximal end cap 30. End cap 30 is configured to couple a UMA plug assembly 105 at the proximal end 23 of joint 20, as exemplified on the right side of FIG. 21. Views of end cap 30 are shown in FIGS. 22 and 23. On the outer surface of external shell 26, an external recess 27 offers a location to insert a removable magnet 53 to release the grip of brake assembly 50. The location for recess 27 shown in FIG. 21 is one of many possible locations within base section 25. Rotatable section 35 includes an external shell 36 and a distal end cap 38. End cap 38 is configured to couple with a UMA socket assembly 305 at the second or distal end 24 of joint 20, as exemplified on the left side of FIG. 21. Views of end cap 38 are shown in FIGS. 24 and 25.

Hollow-core motor 40, which may be a brushless direct current (DC) motor, comprises a generally annular stator 44 surrounding a generally annular rotor 42, which is mounted on a hollow-core rotor coupling 43. Motor axis 41 is aligned with central axis 21. At one end, bearing 56A rotationally couples rotor coupling 43 to external shell 26 of base section 25. The other end of rotor coupling 43 is coupled to an annular, elliptically-shaped wave generator 46 of harmonic drive 45. Continuing to explain harmonic drive 45, wave generator 46 may rotate and may induce rotational motion in bearing 56C and may cause the external gear teeth 47G on a flexspline 47 to movably mesh against a small number of the internal gear teeth 48G on stationary circular spline 48. Circular spline 48 is fixed to internal shell 28 of base section 25. Therefore, when wave generator 46 rotates, the rotation induces a slower rotation in flexspline 47 with respect to stationary circular spline 48. Flexspline 47 is fixed to section 35 of joint 20 by fasteners (not shown) located in through-holes 39. Therefore, if flexspline 47 rotates, section 35 also rotates. In addition, section 35 is rotationally coupled to base section 25 by one or more bearings 56B. With this configuration, section 35 may rotate about axis 21 and move relative to section 25 with or without the energized aid of motor 40.

Continuing to refer to roll joint 20 in FIG. 21, hollow-core brake assembly 50 comprises a brake rotor 54A and a brake stator 54B. In at least one embodiment, brake assembly 50 is equivalent to Kendrion model 86-61104H00. Brake rotor 54A is affixed to rotor coupling 43. Brake stator 54B is affixed to proximal end cap 30 of base section 25. In the disclosed embodiment, brake assembly 50 is electrically actuatable and is configured for fail-safe operation. The fail-safe configuration means that the brake engages and inhibits rotation of rotor 54A relative to stator 54B when electrical power is removed or lost. The brake 50 may also be engaged when power is supplied and commanded to engage. For the brake 50 to engage, a portion of rotor 54A would move toward and contact stator 54B, developing friction. When brake 50 engages, rotor coupling 43, harmonic drive 45, rotatable section 35, and any other connected components achieve a less movable configuration with respect to base section 25. The less movable configuration may result in a slower rotational speed or a fixed, non-moving condition. For section 35 to rotate relative to section 25 of pitch joint 20, brake 50 is energized and activated to release the frictional engagement of rotor 54A and stator 54B.

Another feature is the inclusion of magnetic brake release switch 51, which is distinct from brake 50 but is functionally coupled to the brake 50. Brake release switch 51 is configured with the ability to release the hold of brake assembly 50 when joint 20 is appropriately energized. As stated, releasing the engagement of brake 50 allows section 35 of joint 20 to move relative to base section 25. Release switch 51 is located inside base section 25 near external recess 27 of proximal outer shell 26.

A method for actuating switch 51 to release the hold of brake assembly 50 is to place a removable magnet 53 in external recess 27. A ferrous metal member 52 located near switch 51 holds magnet 53 in place and concentrates the lines of magnetic flux of magnet 53, making it more effective in activating switch 51. Other braking mechanisms with similar functionality may be employed in joint 20 or any joint 5, 60.

Within roll joint 20, central wiring tube 58 is coaxial with axis 21 and extends through the hollow cores of motor 40, harmonic drive 45, brake assembly 50, rotator coupling 43, and various other annular features (e.g., bearings 56) without hindering the rotation of the stated features. Central wiring tube 58 provides a place for installing electrical wires and other elongate features (not shown) that may extend between base section 25 and rotatable section 35 without being disturbed by the multiple revolutions of the motor 40, harmonic drive 45, brake assembly 50, or other annular features. Any of the electrical wires and other elongate features contained in tube 58 may extend between a UMA plug assembly 105 and a UMA socket assembly 305 for power and data exchange. Electrical wires and other elongate features in tube 58 facilitate the exchange of parameters and data between base section 25 and rotatable section 35 of a single joint 20 or between any combination of joints 5, 20, 60, a tool 85, robot controller 12, or similarly connected components.

Figure 26:
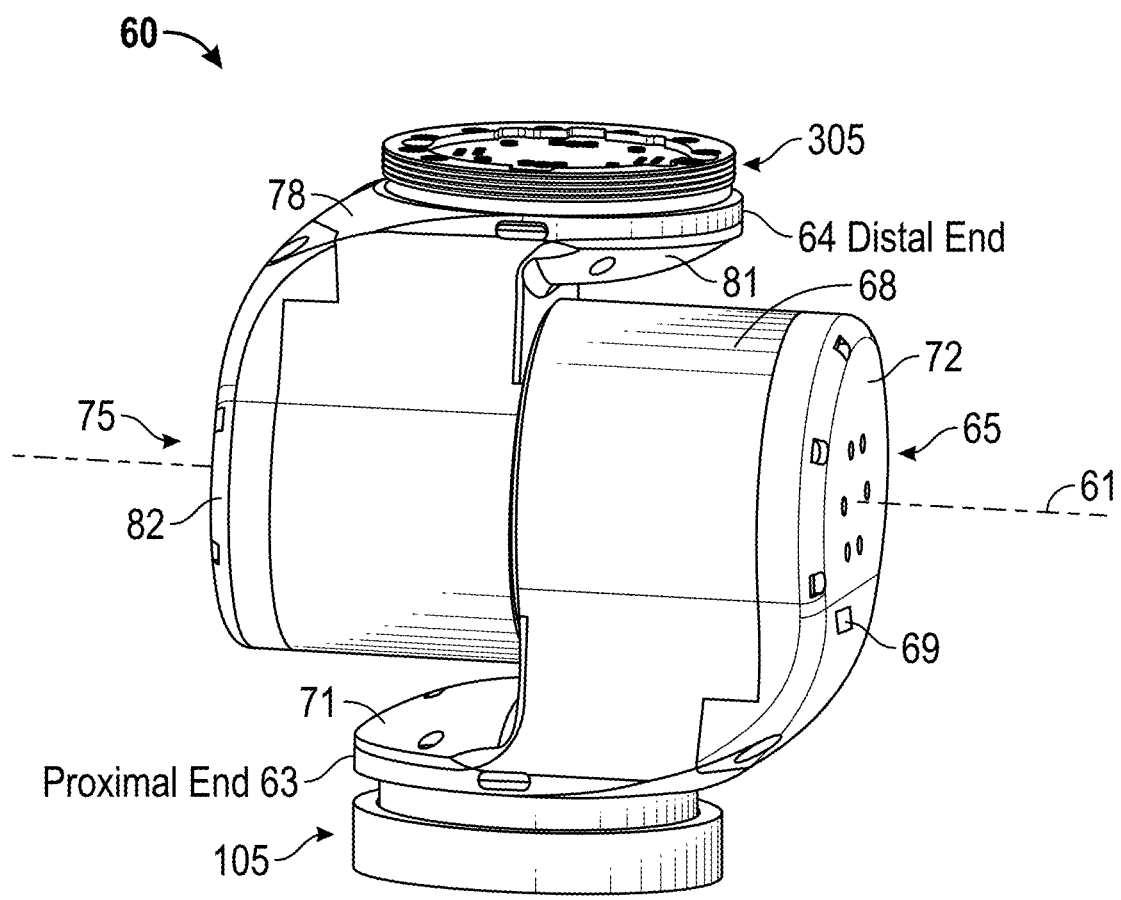
FIG. 26 is a perspective view of a pitch joint that may be incorporated into the robotic manipulator arm of FIG. 1, in accordance with the principles disclosed herein.
Figure 27:
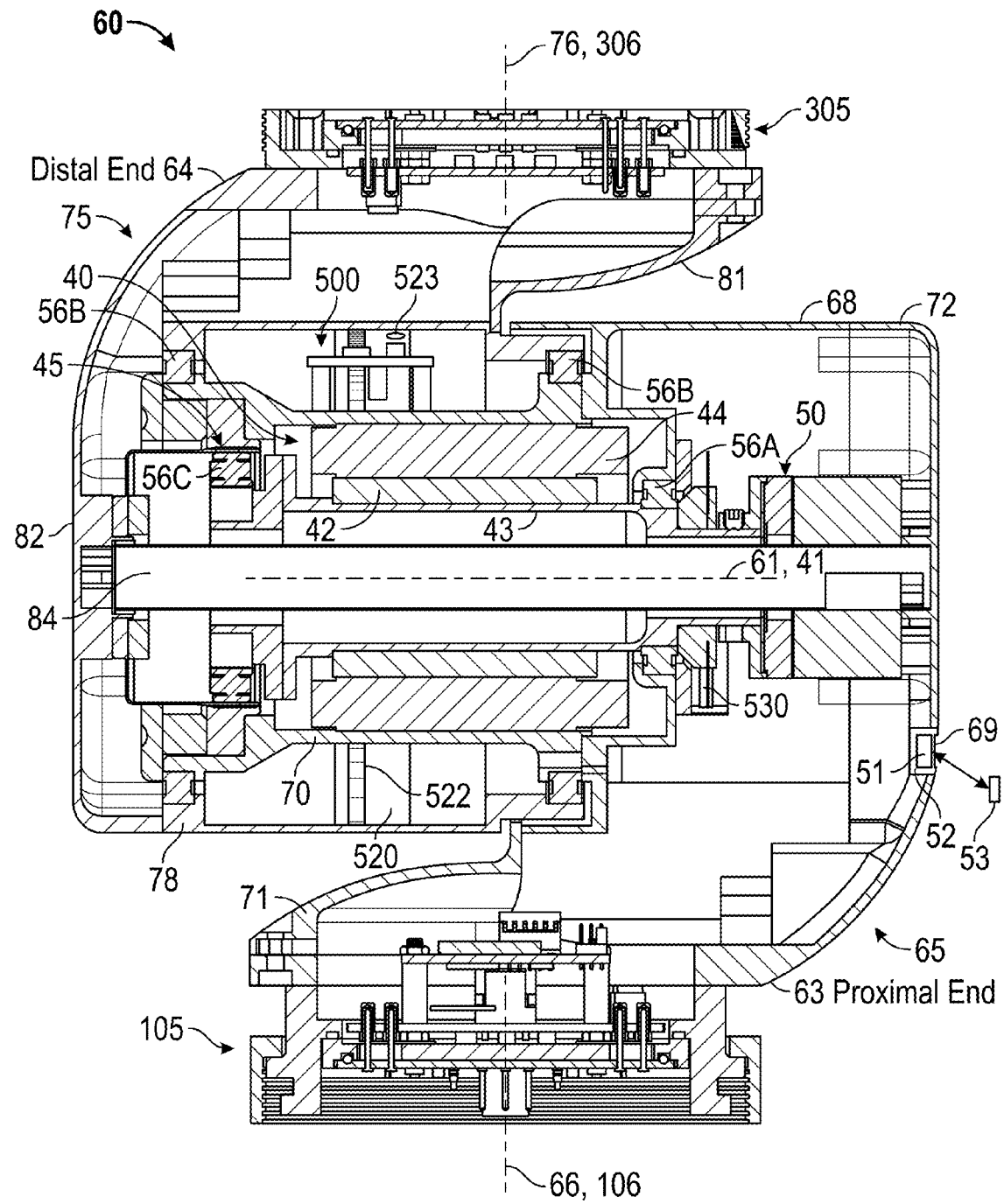
FIG. 27 illustrates a sectional view of the pitch joint in FIG. 26, in accordance with the principles disclosed herein.

A pitch joint 60 is illustrated in FIG. 26. A cross-section of pitch joint 60 is presented in FIG. 27. Pitch joint 60 comprises a joint axis 61, a first or proximal end 63, a second or distal end 64, a base section 65, a rotatable section 75, a motor 40, a gear mechanism, such as harmonic drive 45, a brake assembly 50, one or more rotational bearings 56, and a central wiring tube 84. Base section 65 includes an external shell 68 an internal shell 70, an end cover 71, and a side cover 72. Covers 71, 72 are removable to provide access for maintenance. Internal shell 70 is affixed to external shell 68. Base section 65 also includes a first or proximal mounting axis 66, which is perpendicular to joint axis 61. As exemplified on the bottom of FIGS. 26 and 27, base section 65 is configured to couple a UMA plug assembly 105 at the proximal end 63 of pitch joint 60, having the central axis 106 aligned with the proximal mounting axis 66. On the outer surface of base section 65, external recess 69 offers a location to insert a removable magnet 53 to release the grip of brake assembly 50. One possible location for recess 69 is shown in FIG. 27. Rotatable section 75 includes an external shell 78, an end cover 81, and a side cover 82. Covers 81, 82 provide access for maintenance. Rotatable section 75 also includes a second or distal mounting axis 76, which is perpendicular to joint axis 61. As exemplified on the top of FIGS. 26 and 27, rotatable section 75 is configured to couple a UMA socket assembly 305 at the distal end 64 of pitch joint 60, having the central axis 306 aligned with the distal mounting axis 76.

Continuing to reference FIG. 27, within pitch joint 60, the a hollow-core motor 40 is coupled to internal shell 70 and is coupled to rotatable section 75 through a harmonic drive 45 in a similar fashion and for a similar function as another motor 40 is installed within a roll joint 20, as previously described in reference to FIG. 21. Returning to FIG. 27, motor axis 41 is aligned with joint axis 61. In addition, section 75 is rotationally coupled to base section 65 by one or more bearings 56B. With this configuration, section 75 may rotate about joint axis 61 and thereby move relative to section 65 with or without the energized aid of the motor 40.

A fail-safe brake assembly 50 within pitch joint 60 couples base section 65 and rotational section 75 in a similar fashion and for a similar function as brake assembly 50 within roll joint 20. When brake 50 engages rotatable section 75 and any other connected components of pitch joint 60, rotatable section 75 achieves a less movable configuration with respect to base section 65. The less movable configuration may result in a slower rotational speed or a fixed, non-moving condition. Brake 50 may be energized and activated to release section 75 to rotate relative to section 65. Other features and functions of a brake assembly 50, a release switch 51, a ferrous metal member 52, and a removable magnet 53 were explained previously in relation to roll joint 20 and may be similarly applied to pitch joint 60.

Within pitch joint 60, central wiring tube 84 is coaxial with axis 21 and extends through the hollow cores of motor 40, harmonic drive 45, brake assembly 50, and various other annular features (e.g., rotor coupling 43, bearings 56) without hindering the rotation of the stated features. Central wiring tube 84 provides a place for installing electrical wires and other elongate features (not shown) that may extend between base section 65 and rotatable section 75 without being disturbed by the multiple revolutions of the motor 40, harmonic drive 45, brake assembly 50, or other annular features. Any of the electrical wires and other elongate features contained in tube 58 may extend between a UMA plug assembly 105 and a UMA socket assembly 305 for power and data exchange. Electrical wires and other elongate features in tube 58 facilitate the exchange of parameters and data between base section 65 and rotatable section 75 of a single joint 60 or between any combination of joints 5, 20, 60, a tool 85, robot controller 12, or similarly connected components.

Pitch joint 60 has a symmetric range of motion in both directions. For example, rotatable section 75 may start in the un-bent, "home" position shown in FIG. 26 and rotate about joint axis 61 and relative to base section 65, rotating through an angle in one direction (for example, clockwise) to the maximum extent that section 75 is configured to travel. Next, section 75 may return to the "home" position and rotate through an angle in the opposite, counter-clockwise direction to the maximum extent that section 75 is configured to travel. Because pitch joint 60 is configured with a symmetric range of motion, the maximum angle travelled in the clockwise direction will equal or nearly equal the maximum angle travelled in the counter-clockwise direction. The symmetric configuration of pitch joint 60 may permit a closed-form solution for the inverse kinematics when planning a path of motion for robotic arm 1 and may reduce the need to unwind the joints 5 when traveling along certain trajectories, i.e., paths of travel. Similarly, roll joint 20 may be configured with a symmetric range of motion in both directions.

Some embodiments of the disclosed equipment may include sensors to evaluate and respond to force feedback, environmental conditions, joint rotation, joint extension, sense of touch, or other conditions. The sensors may include hall-effect sensors, rotational encoders, strain gauges, or other sensing components. The sensors may be coupled to a joint 5 or to a tool 85.

Referring now to FIGS. 21 and 27, within each joint 20, 60, an optical encoder and rotating disc pair 530 is axially aligned with a motor 40 and one or more axes 21, 61, 41 and configured to track the rotational position and speed of rotor 42 and rotor coupling 43 with respect to a base section 25, 65. Each joint 20, 60 includes a position sensor assembly 500 and a position-indicating label 520 configured to track the rotational position and, if desired, the speed of rotatable section 35, 75 with respect to base section 25, 65. More clearly seen in FIG. 31, position sensor assembly 500 comprises an angular position sensor 505, a home sensor 510, an electrical coupling 512, stand-off legs 514, and a mounting pad 516. Sensors 505, 510 are mounted to one surface of pad 516 and the legs 514 are attached to the opposite surface of pad 516. Returning to FIGS. 21 and 27, the legs 514 of position sensor assembly 500 may be attached to the cylindrical outer surface of an internal shell 28, 70 of a base section 25, 65, respectively. In this location, sensors 505, 510 are near the inner surface of an external shell 36, 78 of a rotatable section 35, 75, respectively, where position-indicating label 520 is affixed, facing toward sensors 505, 510. An embodiment of label 520 is shown in FIG. 32. The gradient-shaded region 522 extends the entire length of label 520 and therefore may encompass the entire inner circumference of an external shell 36, 78. When installed, gradient-shaded region 522 is intended to be aligned with angular position sensor 505. The single stripe, i.e., solid line, 523 on label 520 is intended to be aligned with home sensor 510. The other linear markings on label 520 may be used to align the label during installation.

Figure 31:
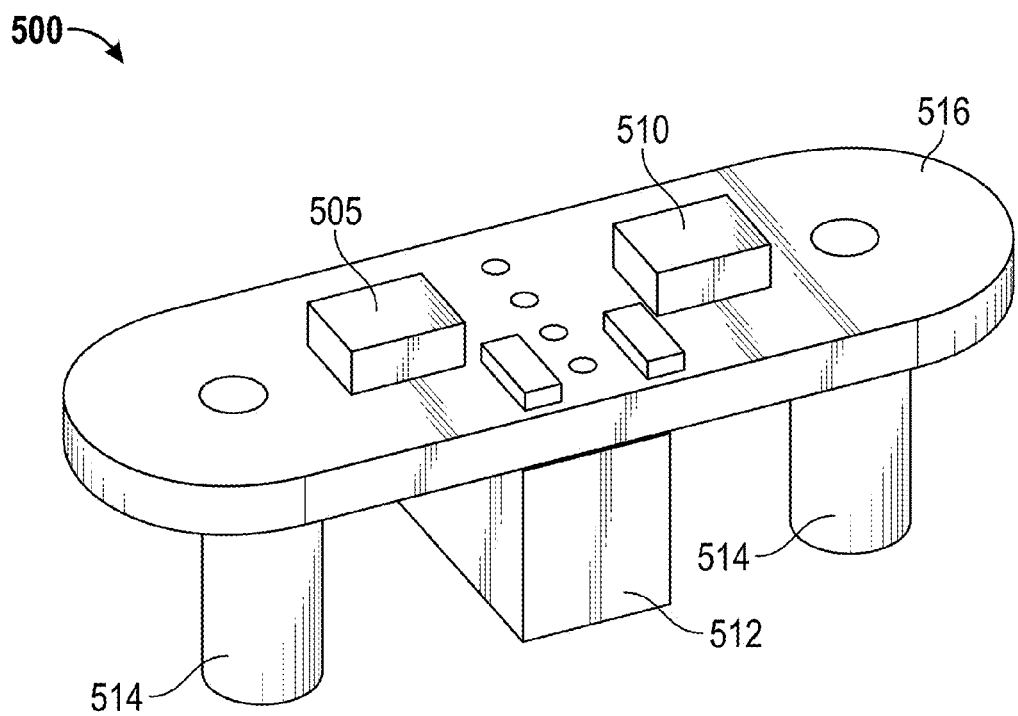
FIG. 31 is a perspective view of a position sensor assembly for a joint, such as the roll joint of FIG. 21, in accordance with the principles disclosed herein.
Figure 32:
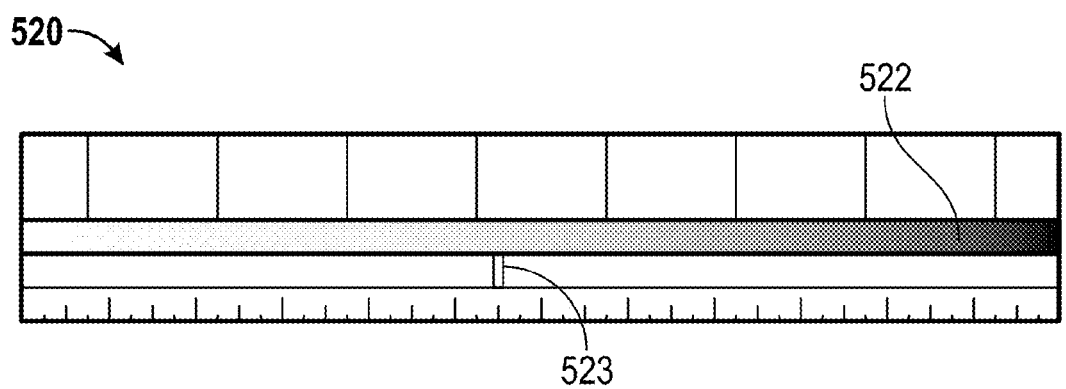
FIG. 32 is a position-indicating label to be read by digital and analog sensors of the position sensor assembly of FIG. 31, in accordance with the principles disclosed herein.

Referring to FIGS. 31 and 32, home sensor 510 may be an optical emitter-sensor pair capable of generating a change in electrical output when the light intensity reflected from an adjacent surface changes by a prescribed threshold. Sensor 510 is configured to generate one level of signal for a light-colored region (e.g., white) and a second signal level for a darker region (e.g., black) such as solid line 523. In some embodiments, home sensor 510 is a digital optical sensor. If a joint 20, 60 is energized and activated, sensor 510 may indicate the one particular angular position of a rotatable section 35, 75 with respect to a base section 25, 65, respectively, wherein solid line 523 is adjacent to sensor 510. This particular angular position may be described as the "home position" of the joint. For a pitch joint 60, as an example, the home position may be configured to be the position in which the distal mounting axis 76 of section 75 is aligned with proximal mounting axis 66 of section 65.

Referring still to FIGS. 31 and 32, angular position sensor 505 may be an optical emitter-sensor pair capable of generating an electrical output proportional to a varying intensity of light reflected from an adjacent surface, such as gradient-shaded region 522. Therefore, if a joint 20, 60 is energized and activated, sensor 505 may indicate the angular position of a rotatable section 35, 75 with respect to a base section 25, 65, respectively. In some embodiments sensor 505 is an analog optical sensor. The range of sensitivity of sensor 505 and the shading spectrum of region 522 on label 520 are configured to give a unique output signal for any angular configuration of joint 20, 60; therefore, sensor 505 may be described as an absolute position sensor. As an absolute sensor, sensor 505 may not require calibration or confirmation each time the joint 20, 60 is initially energized and activated. However, the home signal from home sensor 510 may be used as a redundant confirmation or as an extra calibration aid for angular position sensor 505 if desired.

In other embodiments, position sensor 505 and home sensor 510 may be implemented using another principle for generating and detecting variable or discretely (i.e., distinctly) changing signals based on the relative angular position of two rotatably coupled members, such as, for example, sections 25 and 35 of joint 20 or sections 65 and 75 of joint 60. For example, sensor 505 may respond to a variation in capacitance induced from a position-indication label that has a dielectric strip of varying width in place of the gradient-shaded region 522 of label 520. Similarly, as an example, home sensor 510 may be a capacitance sensor with a one or more discrete dielectric elements configured to pass within range of sensor 510.

Figure 28:
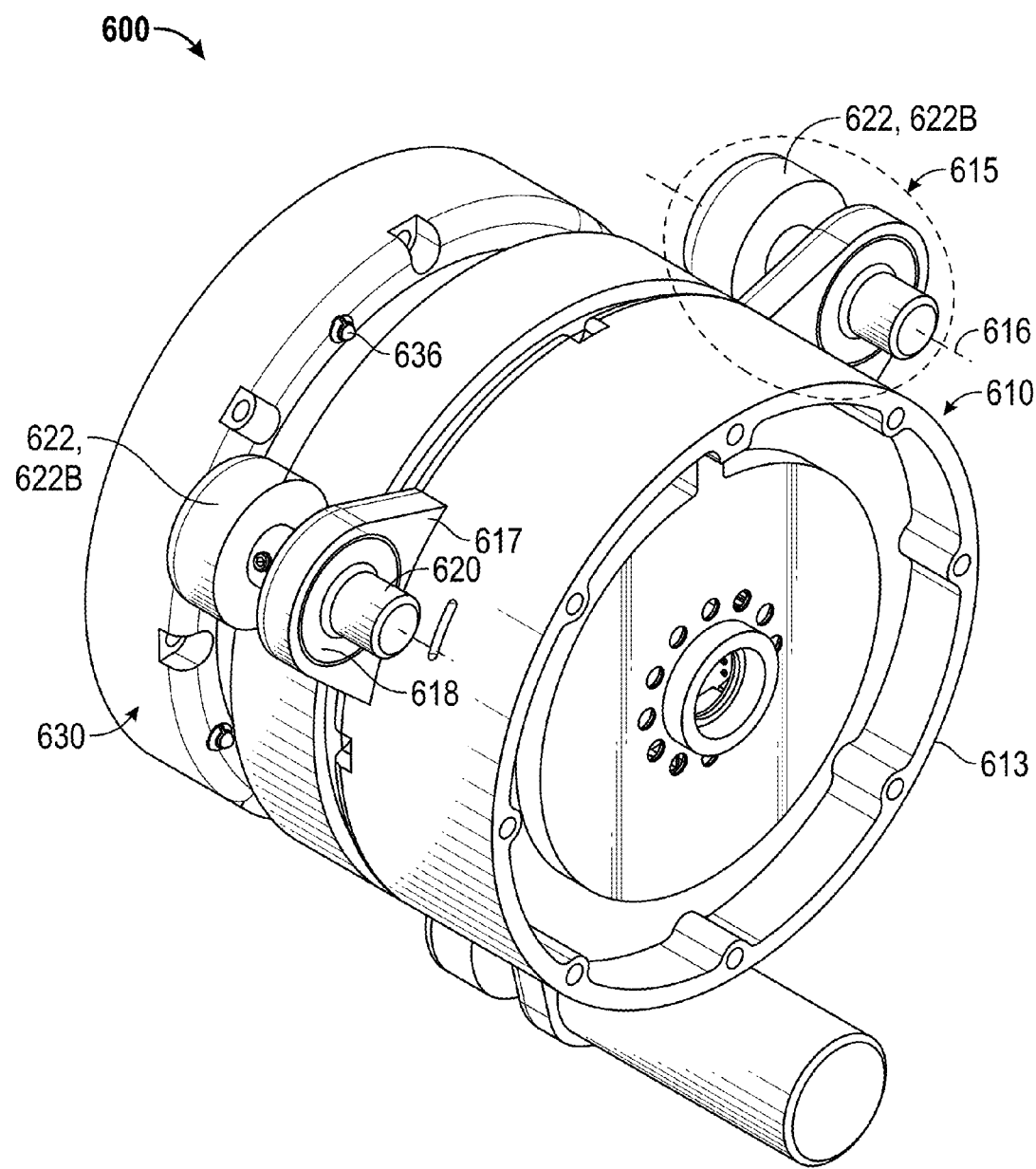
FIG. 28 is a perspective view of automated detach/attach module (ADAM) that incorporates the UMA of FIG. 4, in accordance with the principles disclosed herein.
Figure 29:
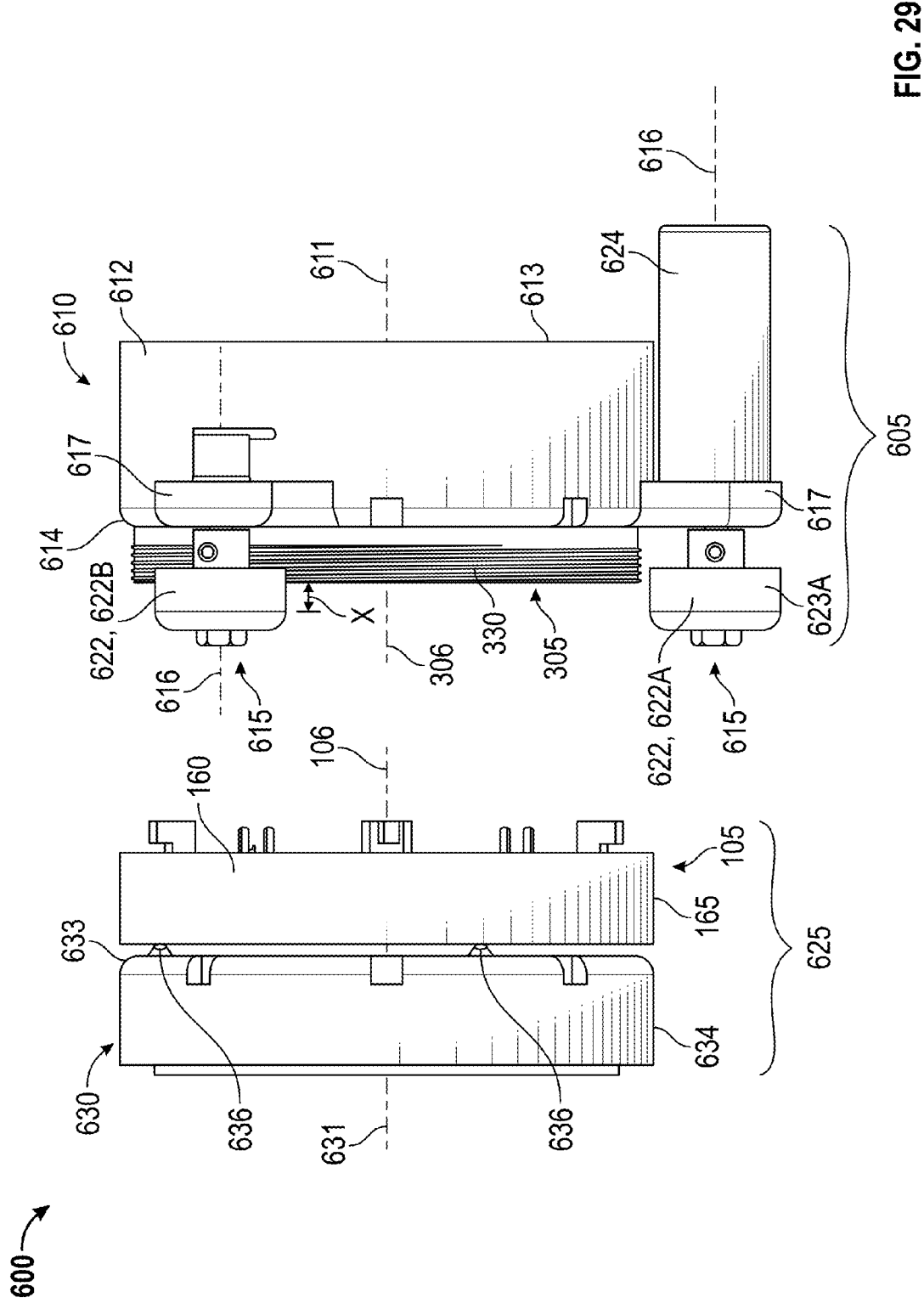
FIG. 29 is a side view of the combined UMA and automated detach/attach module of FIG. 28, in accordance with the principles disclosed herein.
Figure 30:
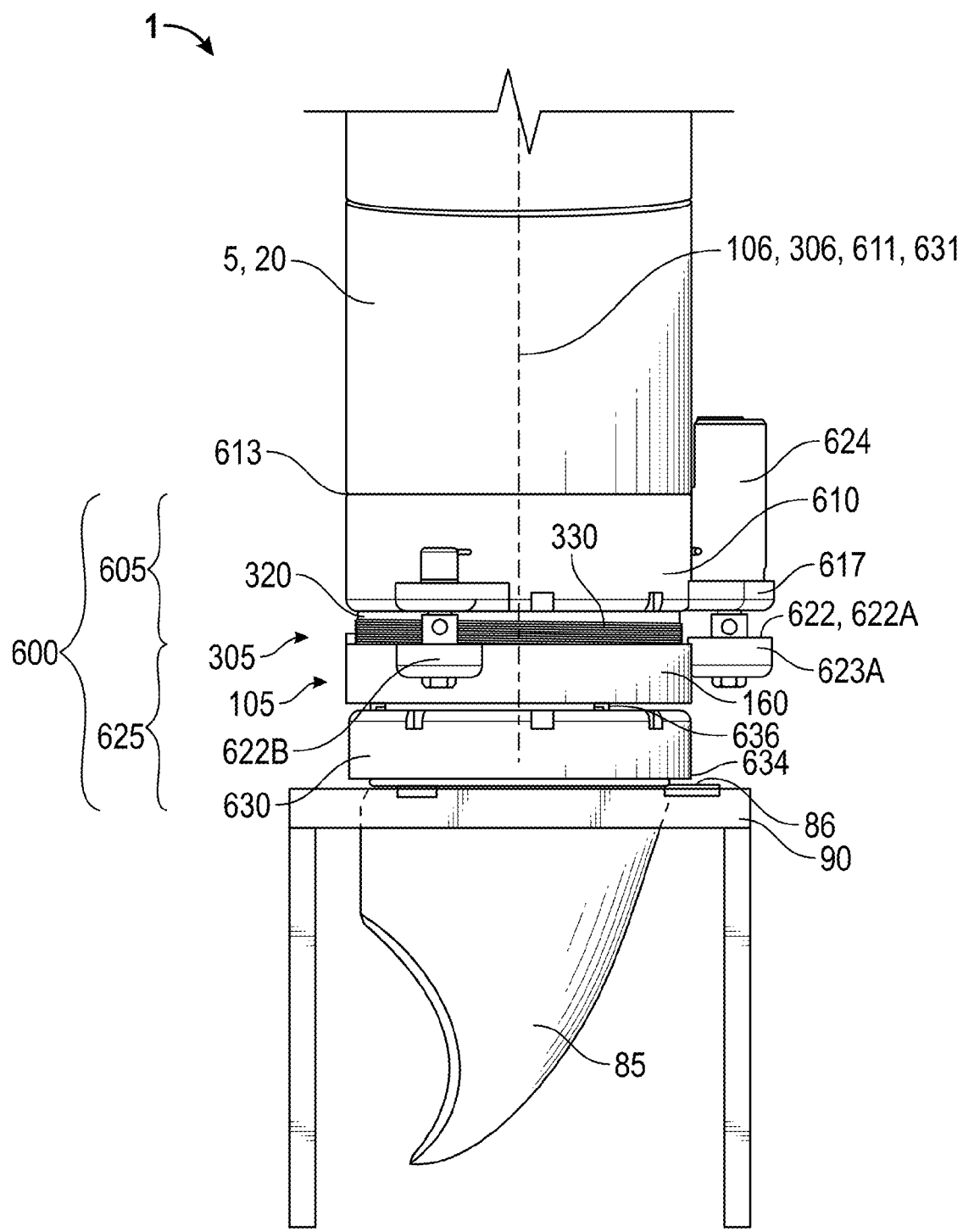
FIG. 30 is a side view of an ADAM coupled to a portion of the robotic manipulator arm of FIG. 1 and coupled to an end-effector tool in accordance with the disclosure of FIG. 3, for which the outline of a tool holder is shown.

FIGS. 28, 29, and 30 illustrate an embodiment of an auto-detach/attach mechanism (ADAM) 600 that may couple a tool 85, also called an end-effector, with the distal end, e.g., end 24, 64, of the most distal joint, which may be a joint 5, 20, 60, of a manipulator arm 1. ADAM 600 includes two portions 605, 625 that may be coupled or decoupled. First portion 605 includes a modified end cap 610 for a socket and a UMA socket assembly 305. Second portion 605 includes a modified end cap 630 for a plug and a UMA plug assembly 105. Modified end cap 610 is generally cylindrical and comprises a central axis 611, a cylindrical outer surface 612, a first or proximal end 613, a second or distal end 614, one or more wheel assemblies 615, and one or more motors 624. Modified end cap 610 may be a modified version of an end cap 38 (FIG. 24) for the distal end 24 of a roll joint 20, or modified end cap 610 may be configured for the distal end 64 of a pitch joint 60. When an ADAM 600 attaches to a roll joint 20, the modified end cap 610 replaces or obviates the use of an end cap 38.

Each wheel assembly 615 includes an axis 616, a wheel bracket 617, a rotatable shaft coupling 618, which may be a ball-bearing assembly, a shaft 620, and a wheel 622. The rotatable shaft coupling 618, shaft 620, and wheel 622 are aligned along the common axis 616. Wheel 622 is rotationally fixed to one end of shaft 620. Shaft 620 is inserted and axially fixed inside rotatable shaft coupling 618, which is affixed to wheel bracket 617. In this configuration, wheel 622 and shaft 620 are free to rotate together relative to wheel bracket 617 as allowed by rotatable shaft coupling 618.

The example of FIGS. 28 and 29 illustrates an ADAM 600 with three wheel assemblies 615 and one motor 624. The three wheel assemblies 615 are coupled to and evenly spaced around the circumference of outer surface 612 at the distal end 614 of modified end cap 610. More specifically, wheel brackets 617 are coupled to the modified end cap 610 and may extend inside the outer surface 612 to facilitate the coupling. The wheel assembly axes 616, and consequently shafts 620, are aligned with central axis 611 of modified end cap 610. The shaft (not independently numbered) of motor 624 is coupled to the shaft 620 of one wheel assembly 615, or the motor 624 shaft is integral with the shaft 620 of one wheel assembly 615. In this configuration, motor 624 may drive the coupled wheel 622, which is also called the driven-wheel 622A. The outer surface of driven-wheel 622A is called the motor-driven surface 623A. The wheels 622 on the wheel assemblies 615 that have no motor may rotate when contacted by a moving object. These wheels with no coupled motor are called idler wheels 622B.

As best seen in FIG. 29, in the first portion 605, a UMA socket assembly 305 is coupled to the distal end 614 of modified end cap 610. Central axis 306 of assembly 305 is aligned and collinear with central axis 611. Wheels 622 extend beyond the end 614. A portion of the outer, contact surface of wheels 622 is axially aligned with external threads 330 on socket assembly 305. The remainder of the contact surface of wheels 622 extends a distance "X" beyond threads 330.

Referring still to FIG. 29, the second portion 625 of ADAM 600 comprises a UMA plug assembly 105 coupled to the proximal end 633 of a modified end cap 630. Modified end cap 630 is generally cylindrical and comprises a central axis 631, a first or proximal end 633, a second or distal end 634, and a plurality of spring-loaded engagement pins 636. Modified end cap 630 may be a modified version of a proximal end cap 30 (FIG. 22) as used at the proximal end 23 of a roll joint 20, or modified end cap 630 may be configured uniquely to match the requirements of a particular tool 85 that may couple at distal end 634. Engagement pins 636 are circumferentially spaced around proximal end 633. Pins 636 are configured to press against and slidingly contact the smooth, external surface 165 of the locking ring 160 in UMA plug assembly 105.

As exemplified in FIG. 30, ADAM 600 is configured to couple an end-effector, such as a tool 85, to a manipulator arm 1 at the most distal joint, which, for example, may be a joint 20. In general, another type of joint 5, 20, 60 may be used, and the joint may be alone, not connected to a complete manipulator arm. A coupling process will be described, but the process is only exemplary of the performance of ADAM 600. The components are not required to be coupled to constitute an ADAM 600. In the example of FIG. 30, the two portions 605, 625 of ADAM 600 are contacting one another or are coupled. A tool 85 couples the distal end 634 of modified end cap 630 while a joint 20 couples the proximal end 613 of modified end cap 610. To achieve this configuration, axis 611 is first aligned with axis 631. Plug connector body 120 (FIG. 7) axially engages socket connector body 320 (FIG. 15). This action brings locking ring 160 in proximity to the external threads 330 of body 320 and in proximity to wheels 622, including motor-driven surface 623A. Engagement pins 636 push ring 160 toward threads 330. When motor 624 is activated, motor-driven surface 623A engages ring 160 causing ring 160 to rotate around axis 611. Consequently, ring 160 may rotate idler wheels 622B. Idler wheels 622B are configured to supply radial, reactive forces to keep ring 160 centered on axis 611 and threads 330. The rotating action engages threads 169 (FIG. 6) of locking ring 160 with threads 330, driving ring 160 upward (in the view of FIG. 30) toward modified end cap 610 and joint 20. The coupling of a tool 85 (representing any compatible end-effector) to the end of a joint 20 may be accomplished automatically, without human interaction, when using an ADAM 600 augmented by a tool holder, such as tool holder 90 that grips tri-lobe adapter plate 86 on tool 85. With an ADAM 600, tool 85 may also be manually installed or removed without activating motor 624S. Alternatively, tool 85 may be manually coupled to a joint 5, 20, 60 by standard end caps 30, 38 (or an equivalent interconnection) and a UMA 100.

Although the disclosed embodiment includes a motor-driven surface 623A as part of a driven-wheel 622A, in other embodiments, motor-driven surface 623A may be part of a rotating belt, a reciprocating arm, the teeth of a ratchet, or another member that engages ring 160.

While disclosed embodiments have been shown and described, modifications thereof may be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters may be varied. Accordingly, the scope of protection is not limited to the embodiments described herein, but is only limited by the claims that follow, the scope of which shall include all equivalents of the subject matter of the claims.

The arrangement and features of UMA 100 components may be modified in some embodiments. As exemplified in FIG. 6, one or more embodiments have been disclosed in which a plug assembly 105 is located on the distal end of a UMA 100 and a socket assembly 305 is on the proximal end. In these embodiments, for example FIG. 21 and FIG. 26, a plug assembly 105 would be installed at the proximal end of joint 5, 20, 60, and a socket assembly 305 would be installed at the distal end of each joint 5, 20, 60. In other embodiments, some components of plug assembly 105 or an entire a plug assembly similar to assembly 105 may be arranged to be at the proximal end of a UMA 100, and some components of socket assembly 305 or an entire a socket assembly similar to assembly 305 may be arranged to be at the distal end of a UMA 100. The relative locations of assemblies 105, 305 on adjacent joints 5, 20, 60 would be swapped accordingly.

What is claimed is:

1. A reconfigurable robotic manipulator arm comprising:
    a first joint including:
        a first end assembly having a mechanical coupling interface and an electrical interface; and
        a second end assembly having a mechanical coupling interface and an electrical interface;
    a second joint including:
        a third end assembly having a mechanical coupling interface and an electrical interface; and
        a fourth end assembly having a mechanical coupling interface and an electrical interface;
    wherein said first and fourth end assemblies are connectable at said first and fourth mechanical coupling interfaces to form a first adapter between said first and second joints including an operative electrical connection between said first and fourth electrical interfaces;
    wherein said first and second joints are detachable at said first adapter and re-connectable at said second and third mechanical coupling interfaces to form a second adapter between said first and second joints including an operative electrical connection between said second and third electrical interfaces;
    an internally threaded locking ring of said first joint configured to rotatably engage and grasp an externally threaded portion of said second joint to couple said first and second joints; and
    at least one motor-driven surface, wherein said motor-driven surface is configured to induce rotational engagement of said first and second joints.

2. The robotic manipulator arm of claim 1, wherein one or more of said joints includes a brake and a magnetic brake release switch configured to be activated by a removable external magnet, and further including a ferrous metal member to augment said magnetic brake release switch.

3. The robotic manipulator arm of claim 1, wherein said first end assembly further comprises mechanical bosses configured to insert into and interlock with multifaceted recesses of said fourth end assembly in only a single orientation.

4. The robotic manipulator arm of claim 1, wherein said electrical interface of said first and fourth end assemblies further comprises a plurality of mating pairs of slidably engageable electrical transfer connectors to transfer data and power therebetween, and further comprises a pair of electrical actuation connectors to enable transfer of data and power on said plurality of electrical transfer connectors;
    wherein said electrical actuation connectors are a shorter length than said plurality of electrical transfer connectors; and
    wherein said transfer of data or power via said electrical transfer connectors will not occur unless said electrical actuation connectors are engaged.

5. The robotic manipulator arm of claim 4, wherein said electrical actuation connectors are spring-loaded axially extendable pins.

6. The robotic manipulator arm of claim 1, wherein said first joint further comprises a first optical encoder position sensor configured to detect an absolute position of said first end assembly with respect to said second end assembly via a position indicator mounted on one of said first or second end assemblies, where said position indicator includes a region of graduated varying optical contrast.

7. The robotic manipulator arm of claim 6, further comprising a second optical encoder position sensor configured to detect an angular position of said first end assembly with respect to said second end assembly via discrete varying optical contrast.

8. A joint for a robotic manipulator arm, said joint comprising:
    a base section;
    a rotatable section;
    a motor configured to rotate said rotatable section or said base section with respect to said other section;
    a brake;
    a magnetic brake release switch including a ferrous metal member,
    wherein said magnetic brake release switch is configured to be activated by a removable external magnet to release said brake and allow relative movement between said rotatable section and said base section;
    a first optical encoder position sensor configured to detect an absolute position of said rotatable section with respect to said base section via a position indicator mounted on one of said rotatable or base section, wherein said position indicator includes a region of graduated varying optical contrast and
    a second optical encoder position sensor configured to detect an angular position of said rotatable section with respect to said base section via discrete varying optical contrast.

9. An adapter for connecting different portions of a robotic system comprising:
    a first assembly including a mechanical coupling interface and an electrical interface;
    a second assembly including a mechanical coupling interface and an electrical interface;
        wherein said first assembly is connectable to a first portion of said robotic system;
        wherein said second assembly is connectable to a second portion of said robotic system;
        wherein said mechanical coupling interfaces are connectable whereby said electrical interfaces are brought into contact to form an operative electrical connection in said adapter;
    an internally threaded locking ring of said first assembly rotatably engages and grasps an externally threaded member of said second assembly to couple said first and second assemblies; and
    at least one motor-driven surface, wherein said motor-driven surface is configured to induce rotational engagement of said first and second assemblies.

10. The adapter of claim 9, further comprising:
    a motor configured to rotate said first assembly with respect to said second assembly;
    a brake; and
    a magnetic brake release switch including a ferrous metal member,
    wherein said magnetic brake release switch is configured to be activated by a removable external magnet to release said brake and allow relative movement between said first assembly and second assembly.

11. The adapter of claim 9 wherein extending mechanical bosses on said first assembly are configured to insert into and interlock with multifaceted recesses of said second assembly in only a single orientation.

12. The adapter of claim 11, wherein said first assembly and said second assembly comprise a plurality of mating pairs of slidably engageable electrical transfer connectors to transfer data and power between said first and second assemblies and one or more attached joints, and further comprise a pair of electrical actuation connectors to enable transfer of data and power on said plurality of electrical connectors;

wherein said electrical actuation connectors are a shorter length than said plurality of electrical transfer connectors; and wherein said transfer of data or power via said electrical transfer connectors will not occur unless said electrical actuation connectors are engaged.

13. The adapter of claim 9, wherein said first assembly and said second assembly comprise a plurality of mating pairs of slidably engageable electrical transfer connectors to transfer data and power between said first and second assemblies and one or more attached joints, and further comprise a pair of electrical actuation connectors to enable transfer of data and power on said plurality of electrical connectors;

wherein said electrical actuation connectors are a shorter length than said plurality of electrical transfer connectors; and wherein said transfer of data or power via said electrical transfer connectors will not occur unless said electrical actuation connectors are engaged.

14. The adapter of claim 13, wherein said electrical actuation connectors are spring-loaded axially extendable pins.

15. The adapter of claim 9, further comprising a first optical encoder position sensor configured to detect an absolute position of said first assembly with respect to said second assembly via a position indicator mounted on one of said first or second assembly, wherein said position indicator includes a region of graduated varying optical contrast.

16. The adapter of claim 15, further comprising a second optical encoder position sensor configured to detect an angular position of said first assembly with respect to said second assembly via discrete varying optical contrast.

17. The adapter of claim 9, further comprising:
a motor configured to rotate said first assembly with respect to said second assembly;
a brake;
a magnetic brake release switch including a ferrous metal member,
wherein said magnetic brake release switch is configured to be activated by a removable external magnet to release said brake and allow relative movement between said first assembly and second assembly, wherein extending mechanical bosses on said first assembly are configured to insert into and interlock with multifaceted recesses of said second assembly in only a single orientation;

wherein said first assembly and said second assembly comprise a plurality of mating pairs of slidably engageable electrical transfer connectors to transfer data and power between said first and second assemblies and one or more attached joints, and further comprise a pair of electrical actuation connectors to enable transfer of data and power on said plurality of electrical connectors;

wherein said electrical actuation connectors are a shorter length than said plurality of electrical transfer connectors; and wherein said transfer of data or power via said electrical transfer connectors will not occur unless said electrical actuation connectors are engaged;

wherein said first assembly and said second assembly comprise a plurality of mating pairs of slidably engageable electrical transfer connectors to transfer data and power between said first and second assemblies and one or more attached joints, and further comprise a pair of electrical actuation connectors to enable transfer of data and power on said plurality of electrical connectors;

wherein said electrical actuation connectors are spring-loaded axially extendable pins that are a shorter length than said plurality of electrical transfer connectors; and wherein said transfer of data or power via said electrical transfer connectors will not occur unless said electrical actuation connectors are engaged;

a first optical encoder position sensor configured to detect an absolute position of said first assembly with respect to said second assembly via a position indicator mounted on one of said first or second assembly, wherein said position indicator includes a region of graduated varying optical contrast; and a second optical encoder position sensor configured to detect an angular position of said first assembly with respect to said second assembly via discrete varying optical contrast.

* * * * *